United States Patent [19]
Motoki et al.

[11] Patent Number: 5,844,880
[45] Date of Patent: Dec. 1, 1998

[54] DISK PLAYBACK DEVICE WITH CHANGER ALLOWING PLAYBACK OF ONE DISK WHILE ANOTHER CAN BE EXCHANGED

[75] Inventors: Masanori Motoki, Nara; Akihiro Yoshioka, Daito; Tadahiro Mitani, Matsubara, all of Japan

[73] Assignee: Sanyo Electric Co., Ltd., Moriguchi, Japan

[21] Appl. No.: 637,341

[22] Filed: Apr. 25, 1996

[30] Foreign Application Priority Data

Apr. 27, 1995 [JP] Japan .................................... 7-103763
May 1, 1995 [JP] Japan .................................... 7-107195

[51] Int. Cl.$^6$ .................................................. G11B 17/22
[52] U.S. Cl. ........................................... 369/191; 369/38
[58] Field of Search ........................... 369/38, 75.2, 191, 369/201, 202

[56] References Cited

U.S. PATENT DOCUMENTS

| | | | |
|---|---|---|---|
| 5,025,338 | 6/1991 | Sone et al. ............................... | 369/194 |
| 5,099,466 | 3/1992 | Kimura et al. ............................ | 369/36 |
| 5,123,001 | 6/1992 | Nakamichi ................................ | 369/36 |
| 5,177,722 | 1/1993 | Nakamichi et al. ..................... | 369/191 |
| 5,327,412 | 7/1994 | Lee ......................................... | 369/201 |
| 5,528,442 | 6/1996 | Hisatomi ................................. | 369/191 |

Primary Examiner—Stuart S. Levy
Assistant Examiner—David D. Davis
Attorney, Agent, or Firm—Armstrong, Westerman, Hattori, McLeland, & Naughton

[57] ABSTRACT

A disk playback device has an opening-closing slide for moving a tray between a stacker and a disk discharge position, and a gear train for horizontally moving the tray between the stacker and a loading completed position. The device further has a first and second slide members for raising or lowering the tray as opposed to an optical head base after the tray is brought to the loading completed position by the gear train, and third slide member for raising or lowering the slide as timed with the ascent or descent of the tray. With the tray brought to the position of the head base, the third slide member further slidingly moves to raise the slide to couple the slide with another tray within the stacker.

2 Claims, 38 Drawing Sheets

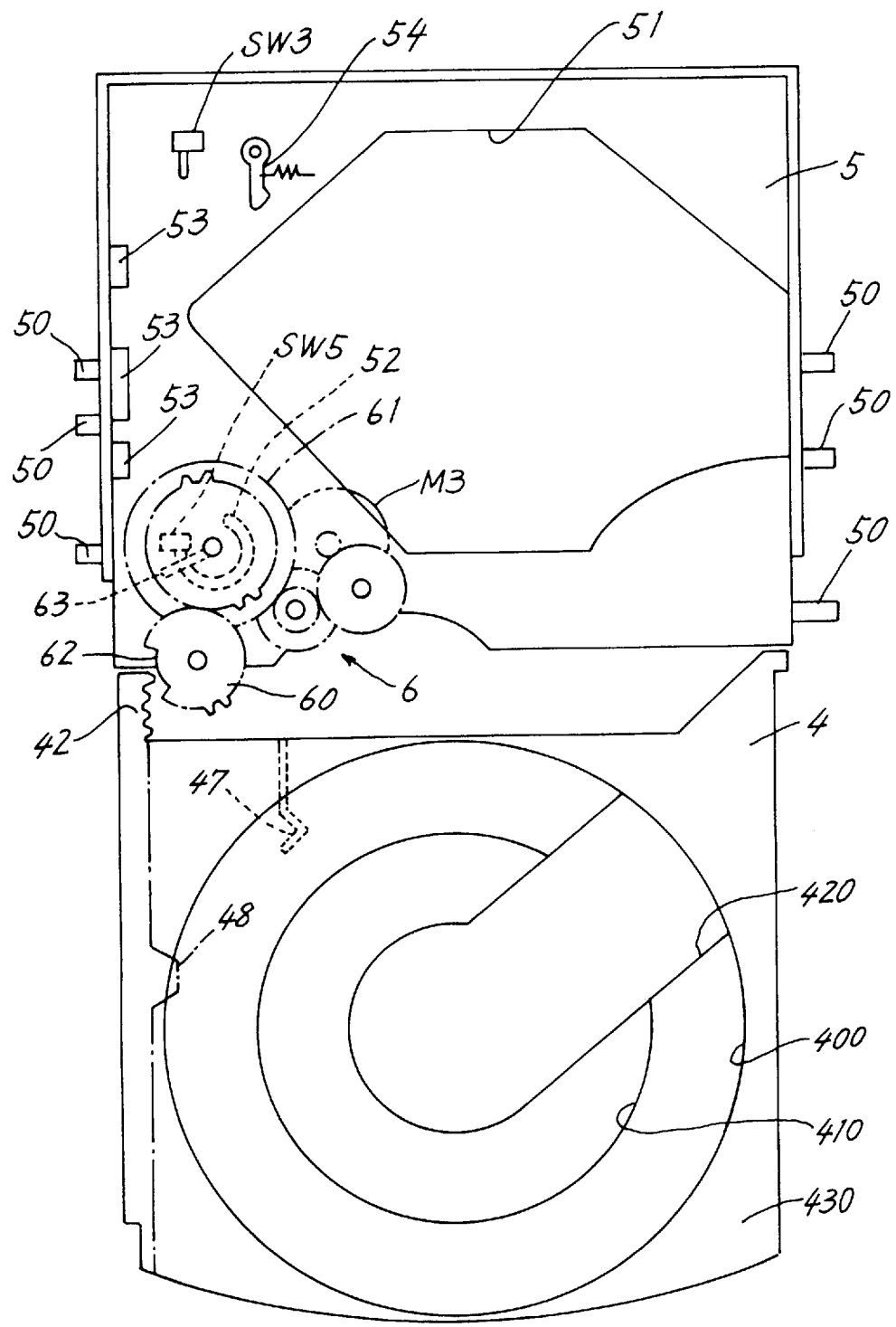

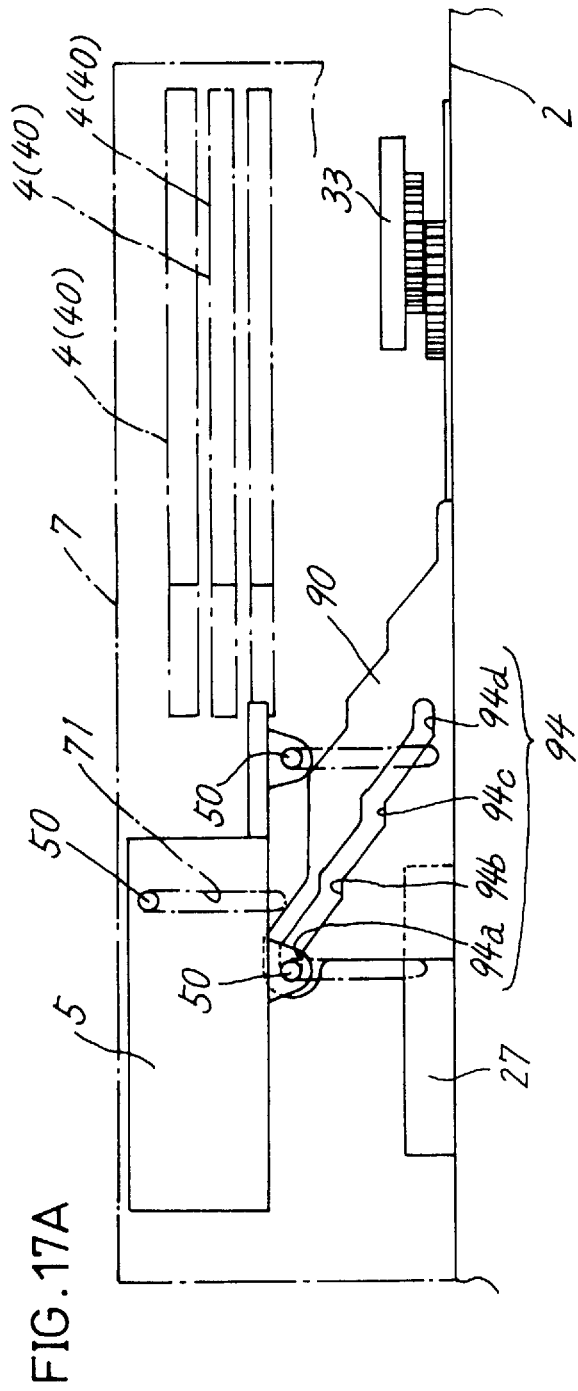
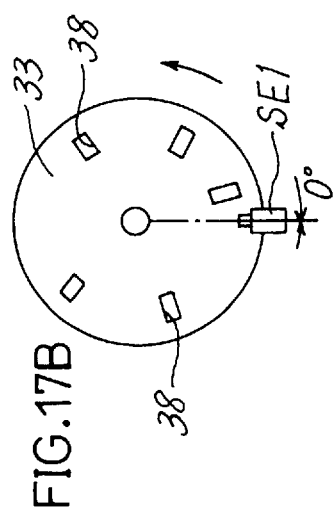
FIG. 17A
FIG. 17B

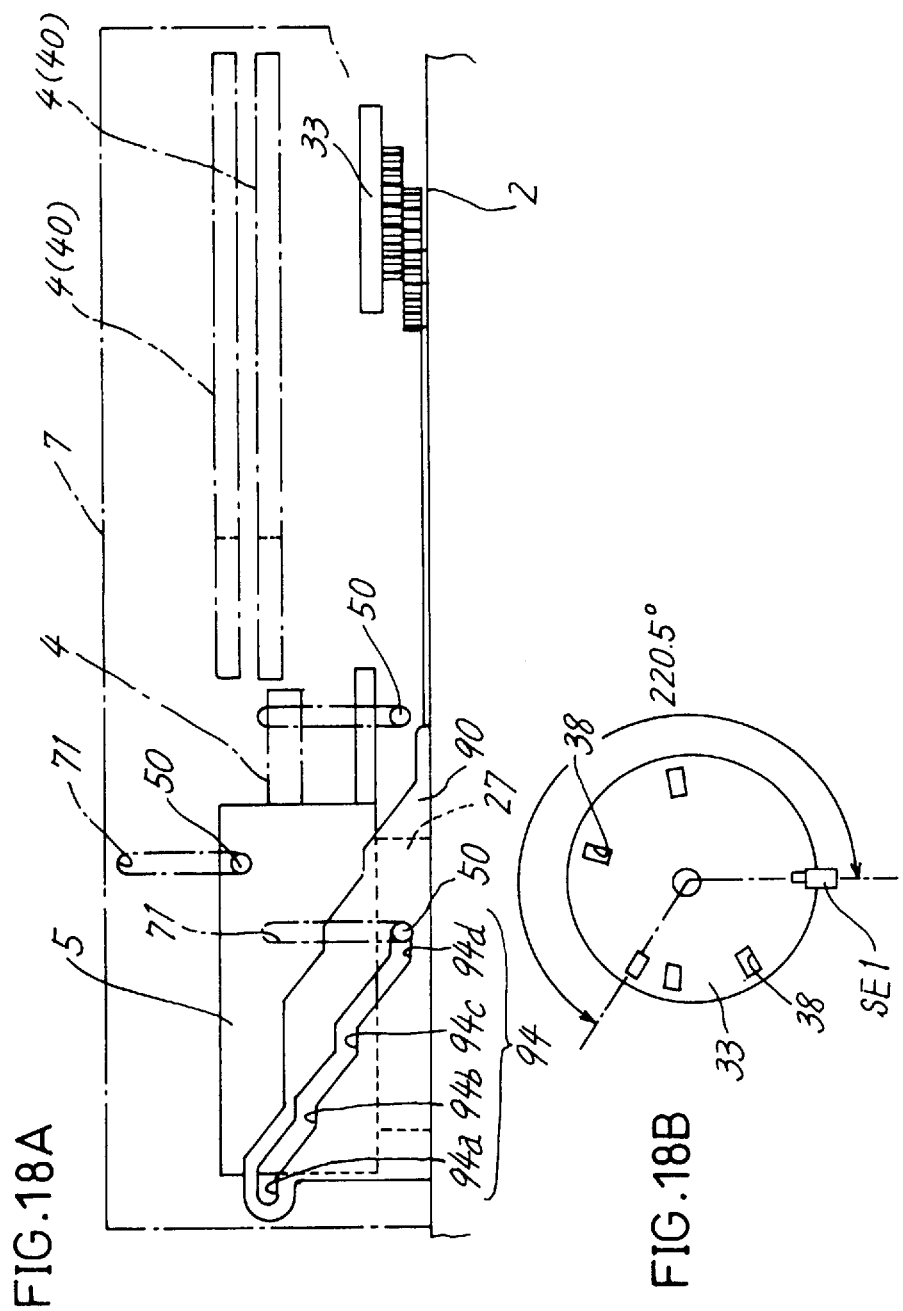

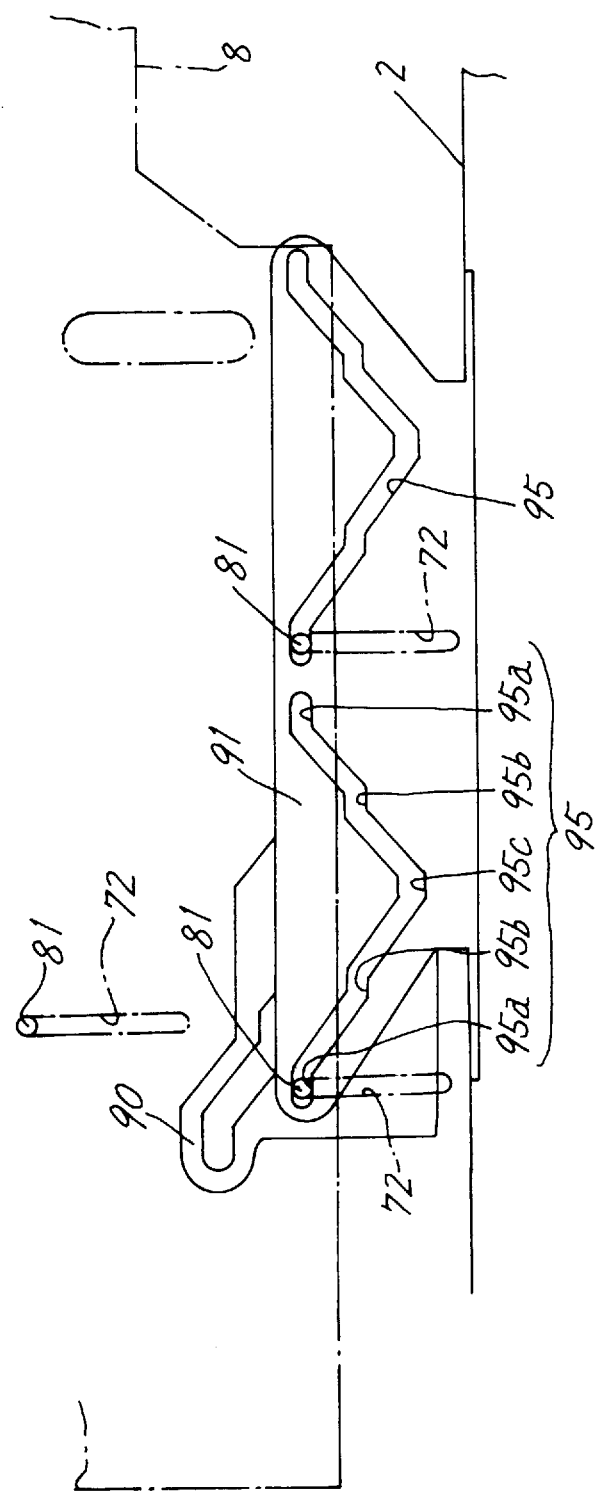

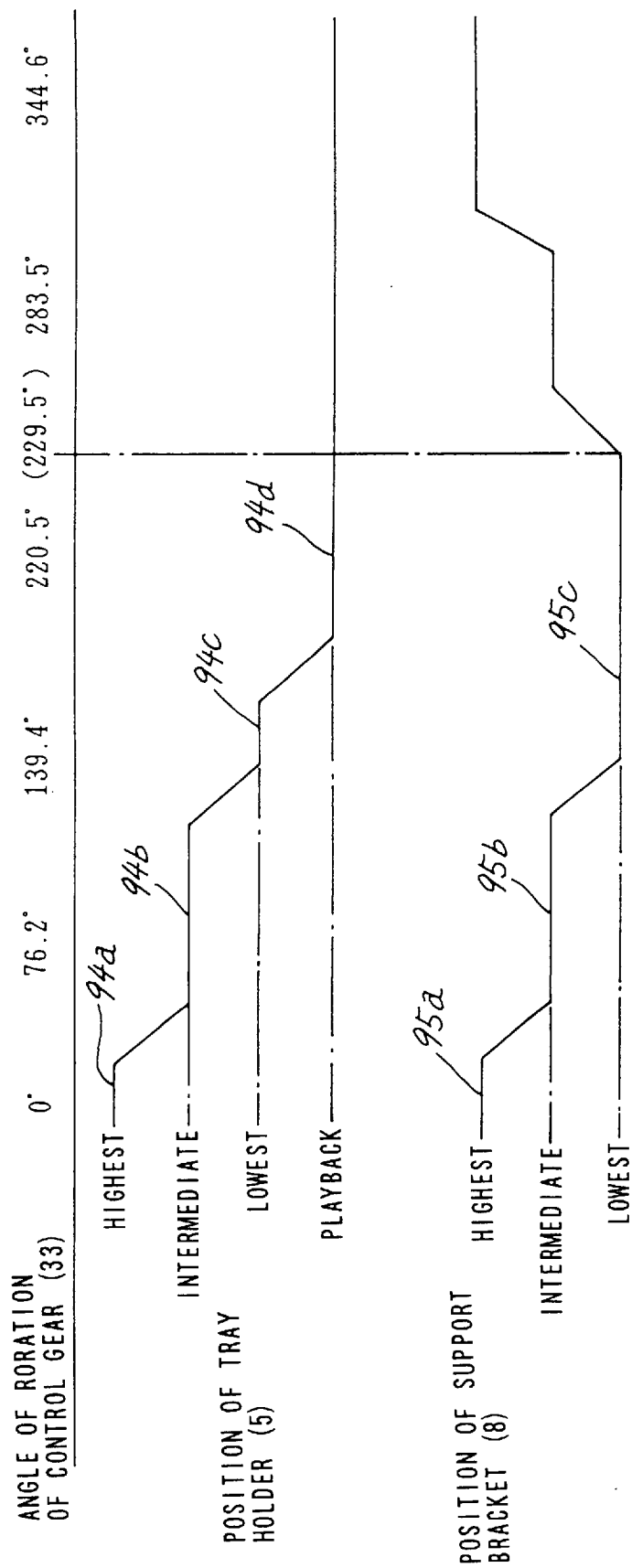

(a)

(b)

DISK PLAYBACK DEVICE WITH CHANGER ALLOWING PLAYBACK OF ONE DISK WHILE ANOTHER CAN BE EXCHANGED

FIELD OF THE INVENTION

The present invention relates to disk playback devices for reproducing information by means of disks serving as recording media. More particularly the invention relates to a disk playback device having the changer function of selectively playing back specified one of disks accommodated therein as arranged one above another.

BACKGROUND OF THE INVENTION

Disk playback devices are already proposed in which a plurality of optically readable disks are arranged one above another and which are adapted to selectively play back one of the disks (see U.S. Pat. No. 5,123,001).

With reference to FIGS. 40 to 45 showing such a device, the main body 1 of the device is provided in its inside rear portion with a stacker 74 for accommodating a plurality of disks D as arranged one above another in layers. The stacker 74 has subtrays 58 for placing the respective disks D thereon. The stacker 74 is in mesh with rotatable worm shafts 59 extending upright from the bottom wall of the device body 1 and is thereby made movable upward and downward.

The device body 1 has a front panel 10, inside of which is provided an optical head base 27 for playing back the disk. Disposed above the head base 27 is a main tray 4 reciprocatingly movable from outside the body 1 to inside thereof and vice versa.

A clamp 57 for holding the disk is disposed above the main tray 4 and is movable upward and downward relative to the head base 27. The main tray 4 carrying the disk thereon is drawn into the device body 1 and opposed to the base 27. In this state, the clamp 57 descends to hold the disk D to the head base 27, whereby the disk is made ready for playback.

When the user is to place a new disk D on the main tray 4 for playback, the main tray 4 is withdrawn, the disk D is placed thereon, and the main tray 4 is stowed in the device body 1.

When the user is to play back a desired disk in the stacker 74, the user manipulates the front panel 10 first to give an input specifying the disk at the desired level within the stacker 74. This causes a drive mechanism to rotate the worm shafts 59 to raise the stacker 74 as seen in FIG. 42. The stacker 74 is halted at a position where the subtray 58 carrying the disk to be played back is located at the same plane as the main tray 4.

In this state, a transport mechanism (not shown) transfers the disk from the subtray 58 to the main tray 4, which moves horizontally to above the head base 27, rendering the disk ready for playback as stated above.

With the conventional disk playback device, the main tray 4 with the disk placed thereon is positioned above the head base 27 during disk playback, so that the main tray 4 alone is not movable during the playback of the disk. During playback, therefore, another disk can not be stowed in the device body 1 or withdrawn from the body 1 to the inconvenience of the user.

SUMMARY OF THE INVENTION

An object of the present invention is to provide a disk playback device wherein while one disk is being played back, another disk can be withdrawn from its stacker or placed into the stacker.

As will be described later, the device has a stacker 74 at an inlet side thereof and disk carrying trays 4 stowed in the stacker 74 and arranged one above another. The tray 4 in the stacker 74 is loaded to a position above an optical head base 27 provided in an inward portion of the device and is therefore lowered toward the base 27 for playing back the disk on the tray 4. An opening-closing slide 80 for moving the tray 4 between the stacker 74 and a disk discharge position is movable up and down independently of a mechanism for loading the tray 4, whereby another tray can be withdrawn from the stacker 74 during disk playback (see FIG. 25).

Another object of the invention is to drive the device with efficiency and safety, and more particularly to make the tray movable upward or downward with safety by locating the tray and a tray sliding gear train in proper position on completion of unloading of the tray.

The present applicant noticed that when such a device is shut off from its power source during disk playback and energized again, the user is unable to recognize to which level position within the stacker the tray carrying the disk which was being played back is to be returned. Although it appears useful to provide a sensor or the like in the stacker for detecting the position in this case, this adds to the number of components to result in an increased production cost.

Another object of the invention is to reliably detect by simple means the level position within the stacker where the tray is to be stowed when the power source is turned on initially.

When the tray 4 is to be unloaded in the disk playback device of the invention, a tray opening-closing mechanism is operated to cause the tray 4 to reliably reach the disk discharge position.

After the tray has been unloaded, a gear train 6 for driving the tray 4 is rotated in the direction of unloading again to bring the tray 4 to the proper position. This assures a smooth loading operation when the tray 4 is loaded again.

When the tray 4 is moved upward or downward, the gear train 6 is rotated in the direction of loading first and then rotated in the unloading direction again. This returns the gear train 6 to the proper position even if the gear train 6 is positioned as displaced toward the direction of rotation from the proper position when the tray 4 is to be started upward or downward. The tray opening-closing mechanism is operated after the completion of unloading operation to restrain a guide bar 40 from slidingly moving undesirably and to locate the guide bar 40 in the proper position.

Consequently, the tray 4 and the tray opening-closing mechanism are smoothly movable upward or downward while being prevented from coming into contat with the gear train 6 and the guide bar 40, respectively, during their upward or downward movement.

When the power source is turned on initially, the tray 4 the presence of which is detected by a loading sensor switch SW3 is first moved to a level position within the stacker 74. Next, the tray 4 is temporarily unloaded, and if the tray 4 collides with another tray 4a, a change-over of a closed position sensor witch SW2 by the opening-closing slide 80 coupled with the tray 4a is detected to detect the tray 4 as located at a wrong level position.

Accordingly, the level position where the tray 4 is to be stowed can be detected reliably by simple means without the necessity of additionally providing sensor means for checking whether the tray 4 has been located at the proper level position.

BRIEF DESCRIPTION OF THE DRAWINGS

FIG. 10 is a plan view showing the relationship between the tray holder and the tray in a closed position;

FIG. 17A is a side elevation showing the tray holder as completely raised;

FIG. 17B is a plan view of the control gear in a reference position;

FIG. 18A is a side elevation showing the tray holder as completely lowered;

FIG. 18B is a plan view showing the control gear as rotated by this movement;

FIG. 21 is a left side elevation showing the position of the second slide member and the third slide member relative to each other in an initial state;

FIG. 24 is a diagram showing the angle of rotation of the control gear and the positions of the tray holder and a support bracket as related to the angle;

DESCRIPTION OF THE PREFERRED EMBODIMENT

In the following description, the direction in which a disk is inserted into the main body 1 of a device will be referred to as "front," and the direction in which the disk is discharged as "rear."

Figure 1:
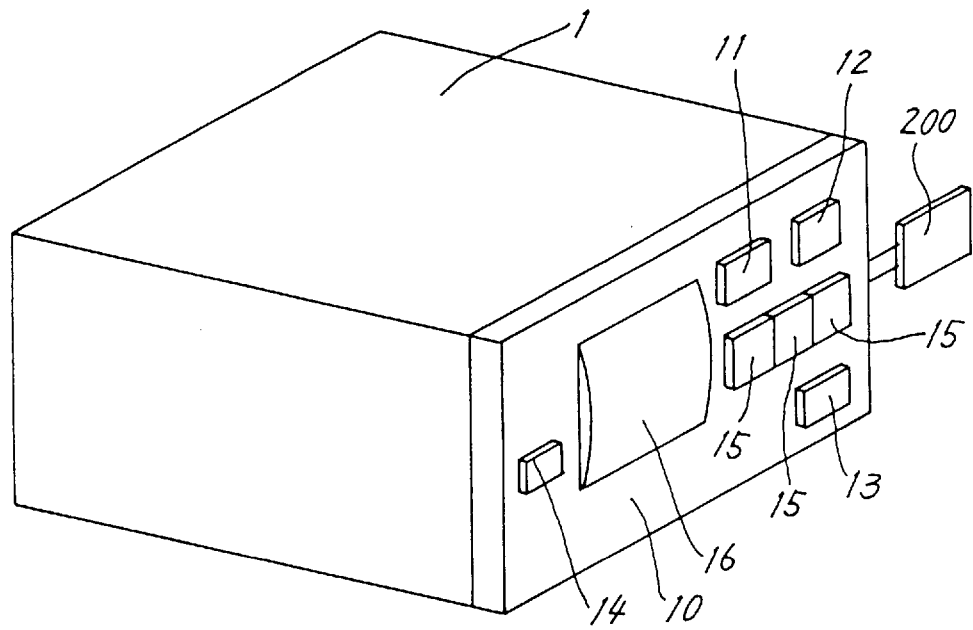
FIG. 1 is an overall perspective view of the main body of a device.
Figure 2:
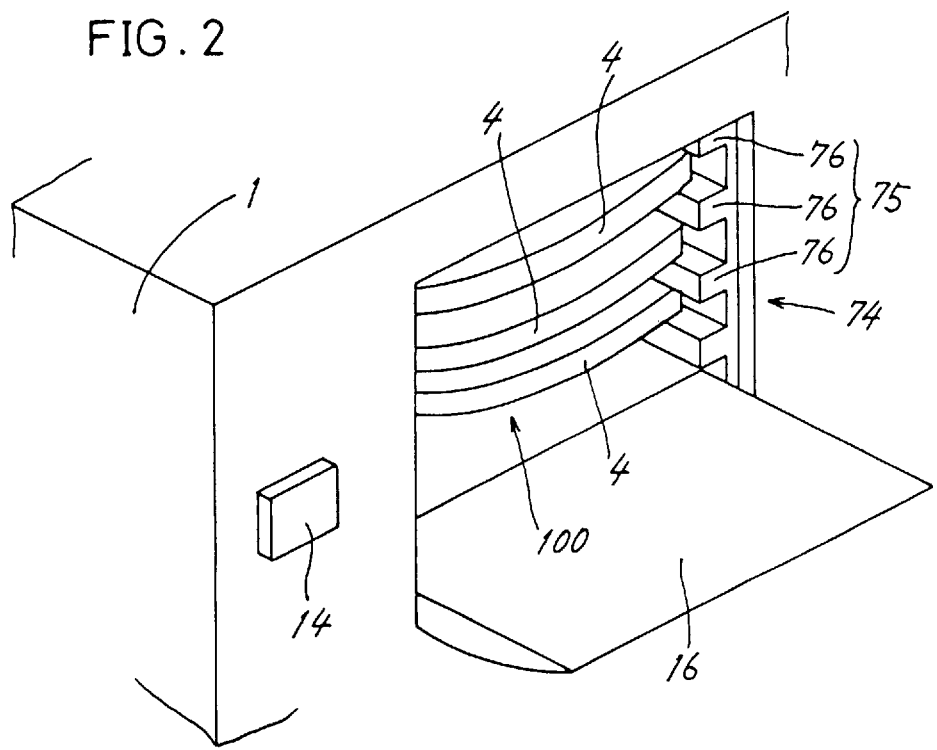
FIG. 2 is a fragmentary perspective view of the device main body with a door opened.

FIG. 1 is a perspective view of the device main body 1. The device main body 1 has an insertion window formed in a front panel 10 and provided with a door 16 which is pivotably supported at its lower end. Provided inside the door 16 is a mechanical deck 100 as seen in FIG. 2. Opening the door 16 exposes a stacker plate 75 inside the deck 100. A plurality of rails 76 are arranged one above another on the inner surface of each of opposite side walls of the stacker plate 75. A tray 4 for carrying a disk thereon is supported on each pair of opposed rails 76. The trays 4 are arranged one above another horizontally. The stacker plate 75 is a component of a stacker 74 for accommodating the trays 4. The trays 4 are three in number in the case of the present embodiment to be described below.

The disk is played back, stopped during playback and withdrawn by manipulating a playback button 11, stop button 12 and open-close button 13 provided on the front panel 10. The power source for the device main body 1 is turned on by manipulating a power button 14. The disk to be played back is selected by selectively manipulating numerical buttons 15, 15, 15. The signals of manipulated buttons are fed to a processor 200 connected to the front panel 10, and the processor 200 controls the operation of the device.

First, the construction of the device will be described briefly.

Entire Construction

Figure 3:
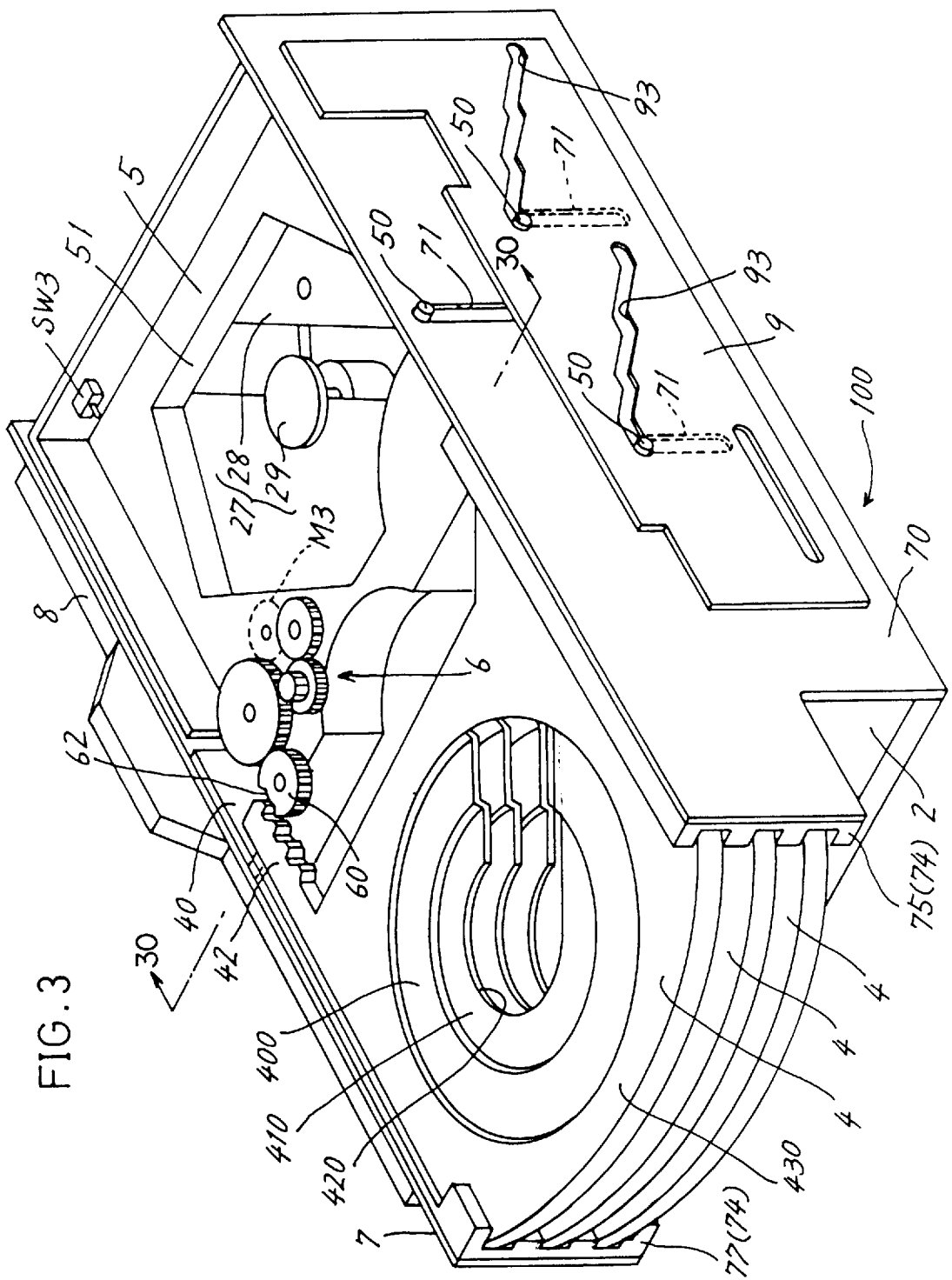
FIG. 3 is a perspective view of a mechanical deck.

FIG. 3, is a perspective view of the mechanical deck 100, and FIG. 17A is a left side elevation of the interior of the mechanical deck 100. The deck 100 has a pair of side plates 7, 70 on a chassis 2. Disposed in an inner portion of the deck 100 is a tray holder 5 movable upward and downward for supporting selected one tray 4 thereon. Disposed below the tray holder 5 is an optical head base 27 mounted on the chassis 2 and having a turntable 29 and a pickup 28.

In the following description, a disk discharge position wherein the tray 4 projects rearward from the stacker 74 will be referred to as an "open position," and a position wherein the tray 4 is stowed in the stacker 74 as a "closed position." The sliding movement of the tray 4 toward the tray holder 5 will be referred to as "loading," and the sliding movement of the tray 4 toward the closed position away from the tray holder 5 as "unloading." Furthermore, "loading completed position" means a position above the head base 27 to which the tray 4 advances from the closed position.

As will be described later, the side plate 7 is provided at a side portion thereof with a tray opening-closing mechanism for moving the tray 4 out of or into the device main body 1. The tray 4 is reciprocatingly movable between the open position and the closed position by the opening-closing mechanism (see FIG. 5). When loaded, the tray 4 descends as placed on the holder 5. With the tray 4 reaching the head base 27, the disk is played back (see FIG. 18A).

Figure 26:
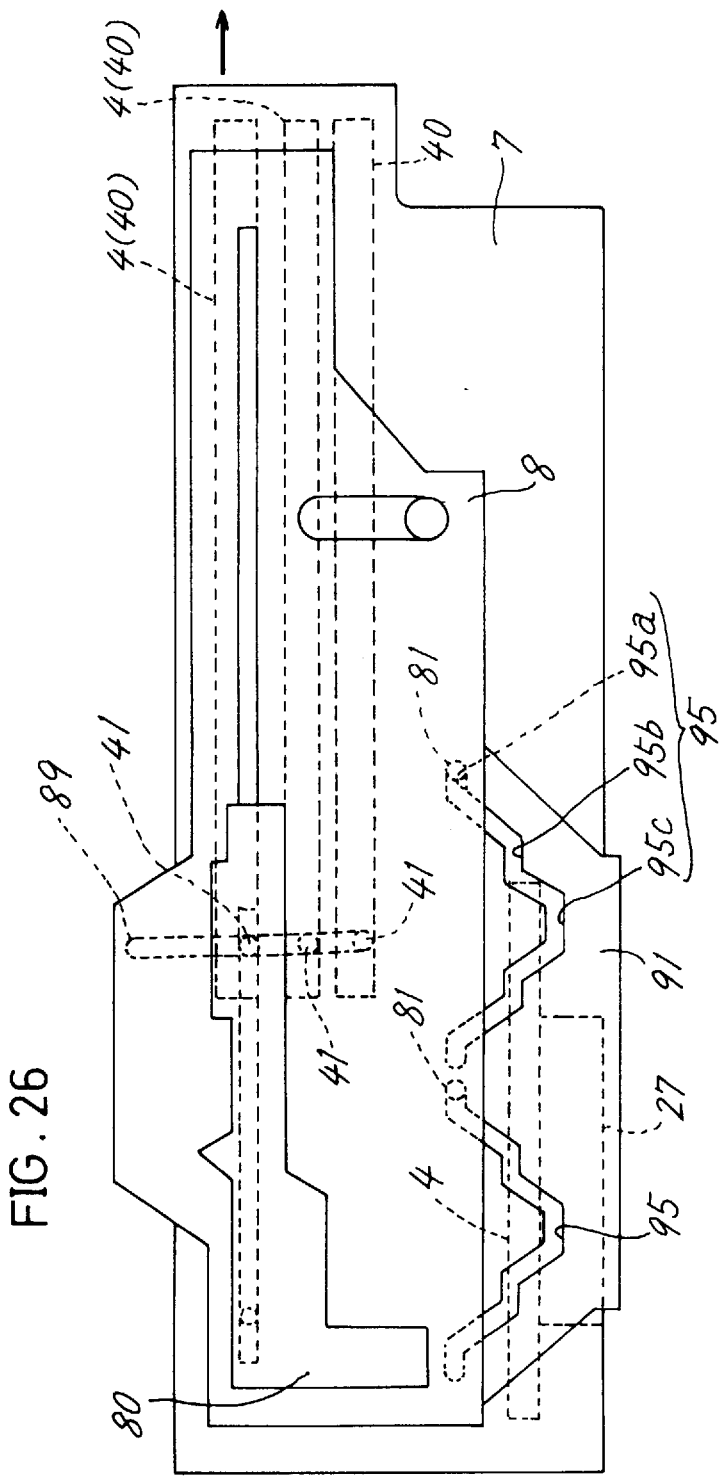
FIG. 26 is a left side elevation showing the tray holder as completely lowered and the support bracket as completely raised.
Figure 30:
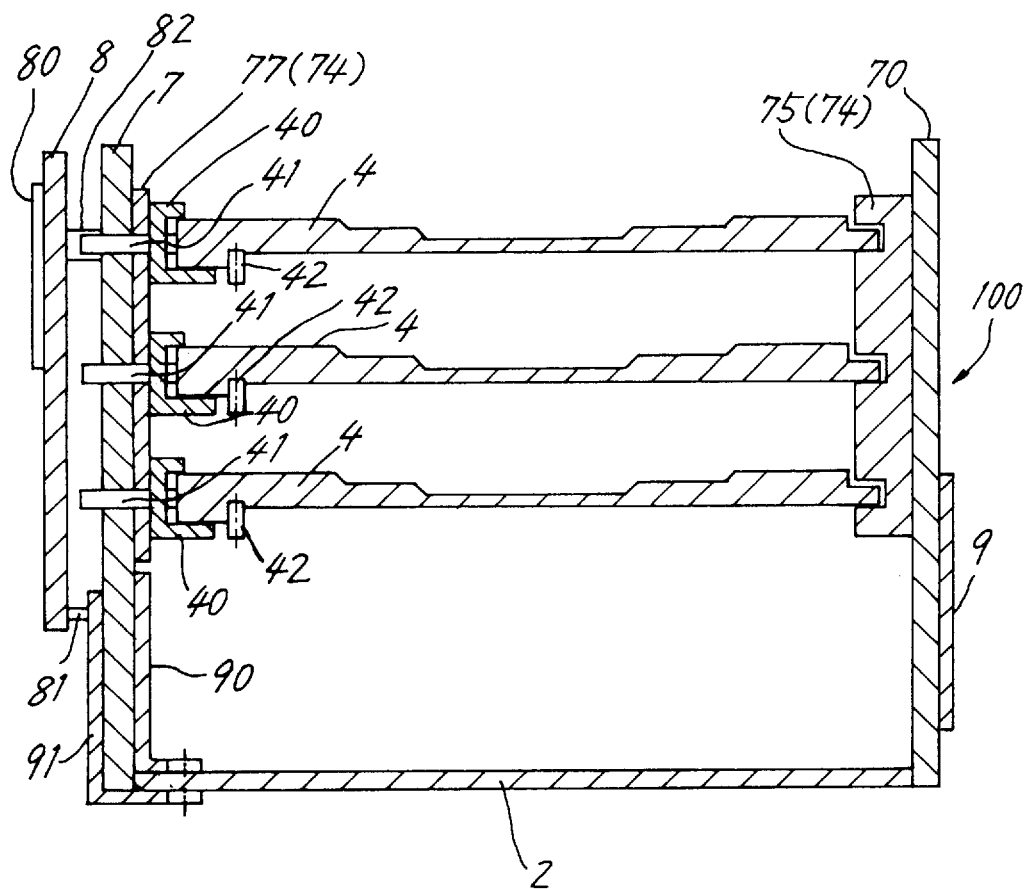
FIG. 30 is a view in section taken along the line 30A–30A in FIG. 3.

Furthermore, with the tray 4 retained at the position of the head base 27, i.e., playback position, it is possible for the tray opening-closing mechanism only to ascend as released from the tray 4 to open another tray 4 within the stacker 74 (see FIGS. 26 and 30).

Details of Entire Construction

Figure 4:
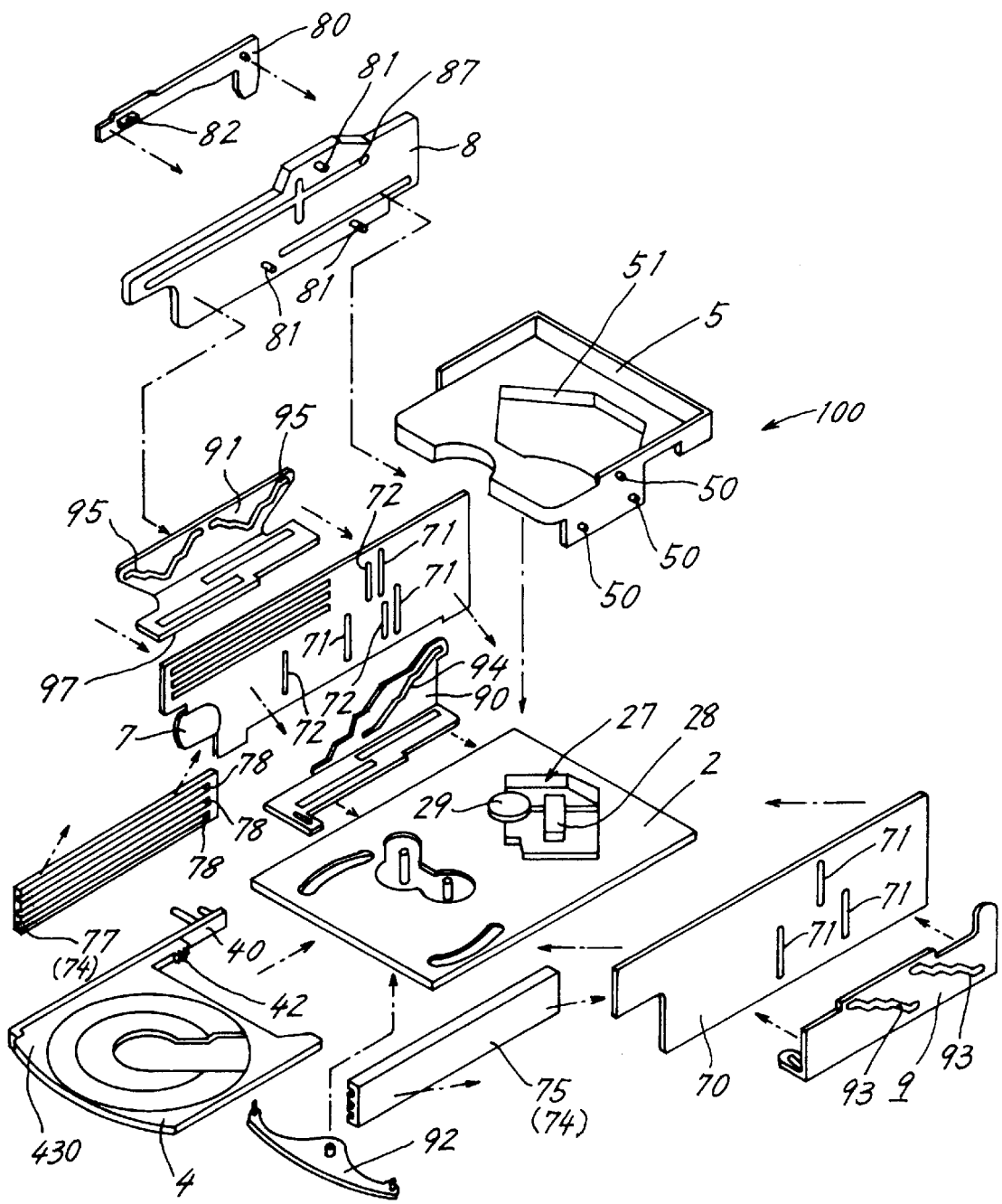
FIG. 4 is an exploded perspective view of the mechanical deck.

FIG. 4 is an exploded perspective view showing part of the mechanical deck 100 of FIG. 3 but not showing gears and switches for convenience of description. Each tray 4 comprises a support plate 430 for placing the disk thereon and has an inward rack 42 formed on a side portion of the plate. A guide bar 40 extending in the front-rear direction is removably fitted to the outer side of the side portion of the tray 4. As shown in FIG. 3, a gear train 6 provided on the tray holder 5 meshes with the rack 42. The tray 4 is slidable forward or rearward by the rotation of the gear train 6. The tray holder 5 is centrally formed with an opening 51 permitting a beam from the pickup 28 to pass therethrough for disk playback. A clamp (not shown) fittable over the center portion of the disk on the turntable 29 is attached to the upper side of the tray holder 5.

A first slide member 9 is attached to the outer side of the right side plate 70. A second slide member 90 is disposed inside the left side plate 7, and a third slide member 91 outside the plate 7. The second and third slide members 90, 91 each have a horizontal portion and a vertical portion. The horizontal portion of the second slide member 90 is slidable in contact with the upper surface of the chassis 2, and the horizontal portion of the third slide member 91 is similarly in contact with the lower surface of the chassis 2. The first slide member 9 and the vertical portions of the second and third slide members 90, 91 are formed with respective cam grooves 93, 94, 95.

Three pins 50, 50, 50 project from each of opposite side walls of the tray holder 5. The three pins 50, 50, 50 on the right side wall fit respectively in first vertical slots 71, 71, 71 formed in the side plate 70. Two of these pins extend through the slots 71, 71 and engage in respective cam grooves 93 of the first slide member 9. The other pin fits in the other slot 71. The tray holder 5 is slidable upward or downward along the first vertical slots 71, 71, 71.

The foremost one of the pins 50, 50, 50 on the left side wall of the tray holder 5 extends through the cam groove 94 of the second slide member 90 and engages in a first vertical slot 71 in the side plate 7. The other pins 50, 50 fit directly in respective first vertical slots 71, 71 in the plate 7.

The first and second slide members 9, 90 are linked by a pivotal lever 92 supported on the lower surface of the chassis 2. When the second slide member 90 slidingly moves forward or rearward, the rotation of the pivotal lever 92 drives the first slide member 9 in an opposite direction to the second slide member 90.

The forward or rearward movement of the first and second slide members 9, 90 vertically moves the tray holder 5 along the cam grooves 93, 94 and first vertical slots 71. The tray 4 and the tray holder 5 descend after the tray 4 is transported forward and placed on the holder 5 by the gear train 6. The tray 4 reaches the optical head base 27, and the disk is played back.

The left side plate 7 is formed with second vertical slots 72, 72, 72 having a smaller width than the first slots 71. Disposed at the outer side of the third slide member 91 is a support bracket 8 made of resin and opposed to the side plate 7.

The support bracket 8 has three pins 81, 81, 81 projecting inwardly thereof. Two of these pins 81 extend through the cam grooves 95, 95 and fit in the second vertical slots 72, 72, respectively. The other pin 81 fits in the other second slot 72. The bracket 8 is allowed to move upward and downward only. Attached to the outer side of the bracket 8 is an opening-closing slide 80 fitting in a guide slot 87 formed in the support bracket 8 and extending longitudinally thereof.

As will be described later, the slide 80 slidingly moves forward along the guide slot 87 to transport the tray 4 to the closed position within the stacker 74. When moving rearward, the slide 80 moves the tray 4 toward the disk discharge direction. Thus, the slide 80 constitutes the tray opening-closing mechanism.

Attached to the inner side of the left side plate 7 is a guide plate 77, which has three slots 78 extending in the front-rear direction and arranged one above another. The three trays 4, 4, 4 are supported by being held between the guide plate 77 and the stacker plate 75. Accordingly, the stacker 74 comprises the stacker plate 75 and the guide plate 77. The trays 4 are spaced apart at a predetermined distance and extend between the stacker plate 75 and the guide plate 77 when stowed in the stacker (see FIG. 30).

Figure 28:
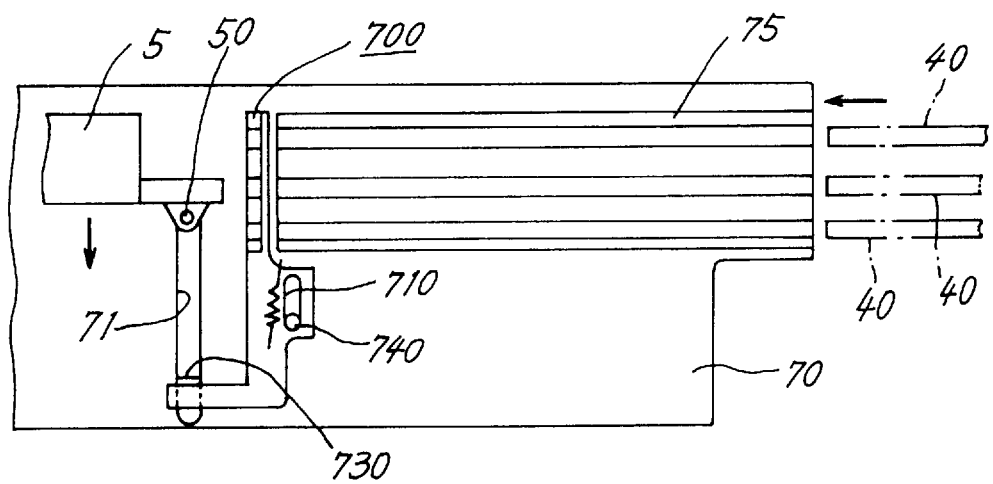
FIG. 28 is a side elevation showing the inner side of a side plate.
Figure 29A:
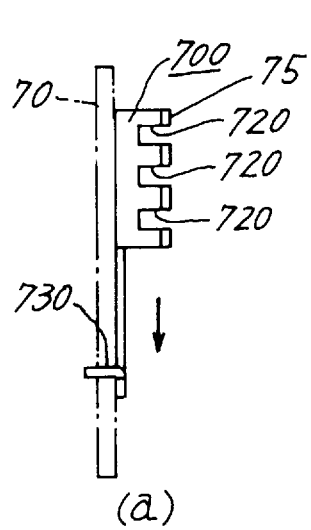
FIG. 29A is a front view showing a shutter plate in register with a stacker plate.

With reference to FIGS. 28 and 29, provided on the inner side of the right side plate 70 is a shutter plate 700 opposed to the front end of the stacker plate 75. The shutter plate 700 has a vertical slot 710 formed in a lower portion thereof. A projection 740 projecting inward from the side plate 70 fits in the slot 710, rendering the shutter plate 700 free to move upward and downward. The plate 700 is biased upward by a spring and pulled up until the lower end of the slotted portion 710 contacts the projection 740 while the tray holder 5 is held in a raised position.

The shutter plate 700 has cutouts 720, 720, 720 in conformity with the front opening of the stacker plate 75, and an arm 730 projecting outward from its lower end and fitting in the first vertical slot 71 at a position slightly above the slot lower end. In this state, the cutouts 720 are in register with the front opening of the stacker plate 75.

Figure 29B:
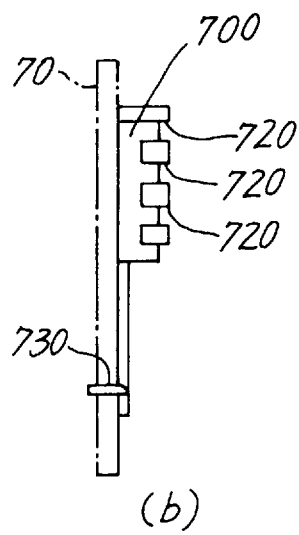
FIG. 29B is a front view showing the stacker plate closed by the shutter plate.

Immediately before the completion of descent of the tray holder 5, the pin 50 depresses the arm 730 of the shutter plate 700, which closes the front opening of the stacker plate 75 as seen in FIG. 29B, preventing the trays 4 in the stacker 74 from moving forward. Accordingly, even if the device body 1 is subjected to external impact during disk playback with one tray 4 and the tray holder 5 placed on the head base 27, the other trays 4 are prevented from moving forward.

As shown in FIG. 3, the support plate 430 of the tray 4 is formed with a first recessed portion 400 having a diameter approximately equal to the outside diameter (12 cm) of disks of standard size. With the disk D placed in the recessed portion, the upper surface of the disk D is flush with the upper surface of the tray 4 (see FIG. 9B).

Figure 5:
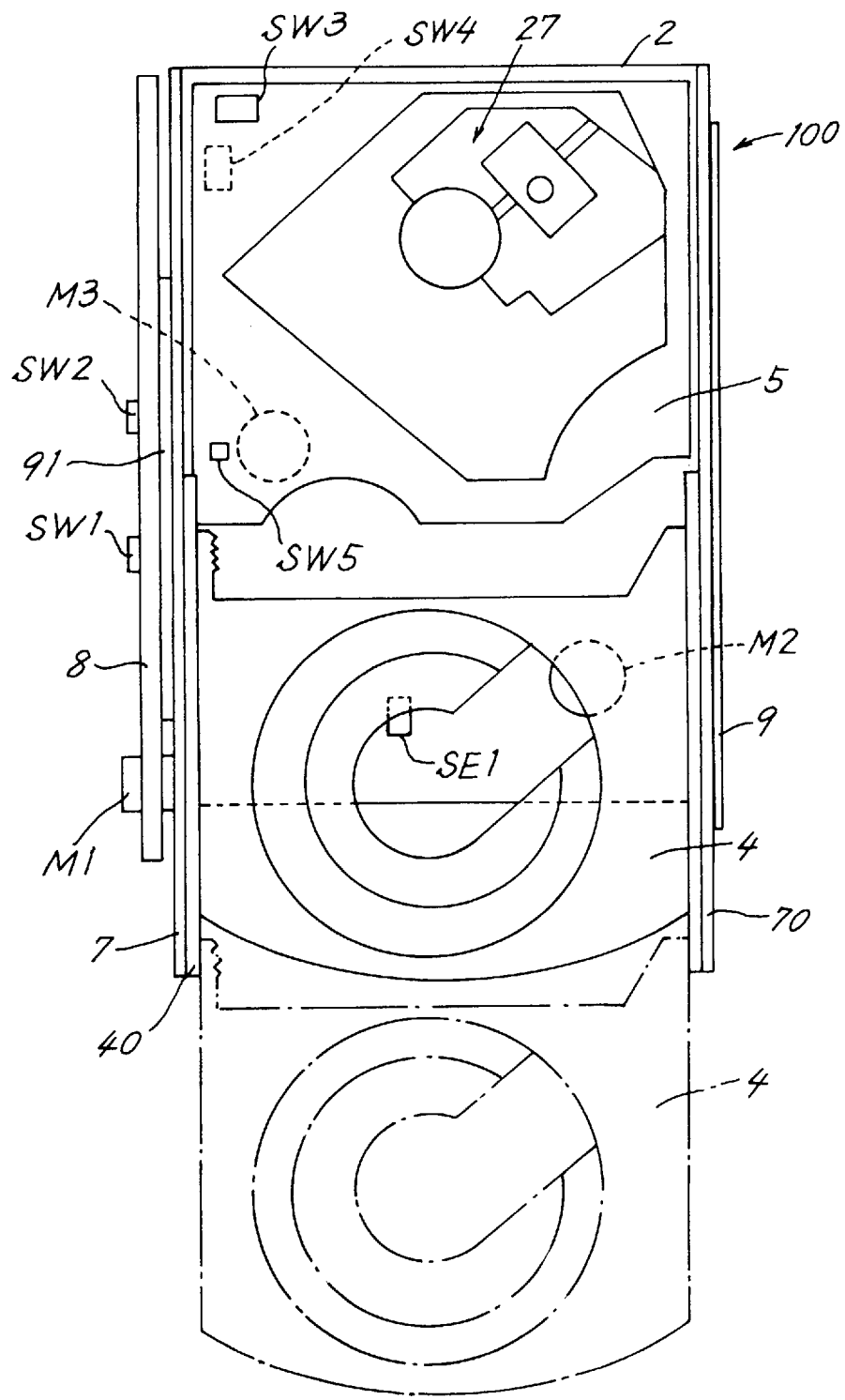
FIG. 5 is a plan view of the mechanical deck.

The first recessed portion 400 is formed with a second recessed portion 410 having a smaller diameter than the first recessed portion 400 and concentric with this portion 400 for placing in a disk with an outside diameter of 8 cm. The recessed portions 400, 410 have a hole 420 for the beam from the pickup to pass therethrough. To make the overall device lightweight, the trays 4 and the holder 5 are prepared from synthetic FIG. 5 is a plan view for illustrating the sliding movement of the tray 4. Indicated at M1 to M3 are motors for driving mechanism components, and at SW1 to SW5 are switches for detecting movement completed positions of mechanism components. A sensor SE1 comprises a photocoupler. The tray 4 is moved out and in by the motor M1, the tray holder 5 is moved upward and downward by the motor M2, and the tray 4 is loaded and unloaded by the motor M3.

The switches SW1 to SW4 and the sensor SE1 are connected to input ports of the processor 200, and the motors M1 to M3 to output ports thereof. The manual buttons on the front panel 10 are connected to the processor 200, and various modes are set by manipulating such buttons. The mechanisms to be controlled by the motors and switches will be described below in detail.

Figure 6:
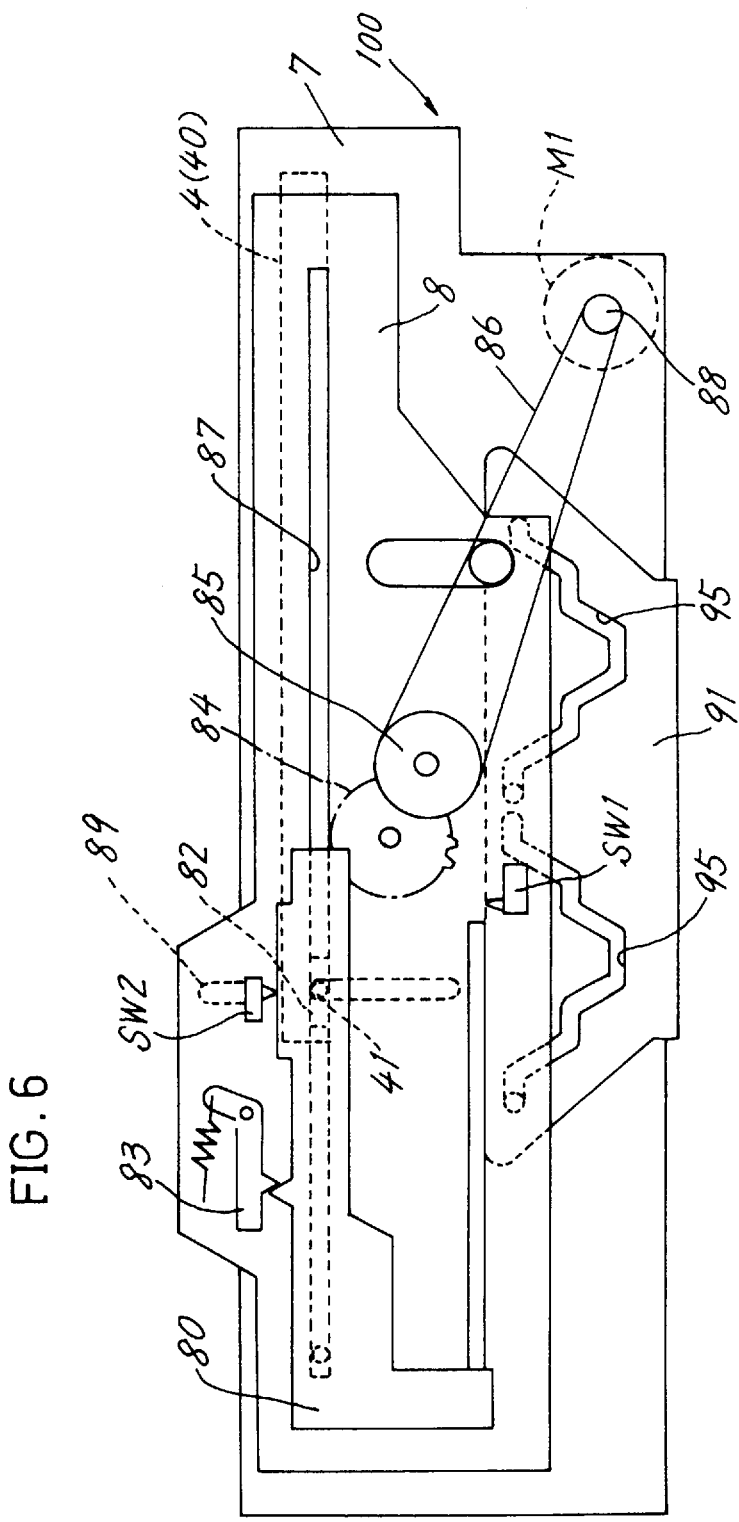
FIG. 6 is a left side elevation of the deck in a closed position.
Figure 7:
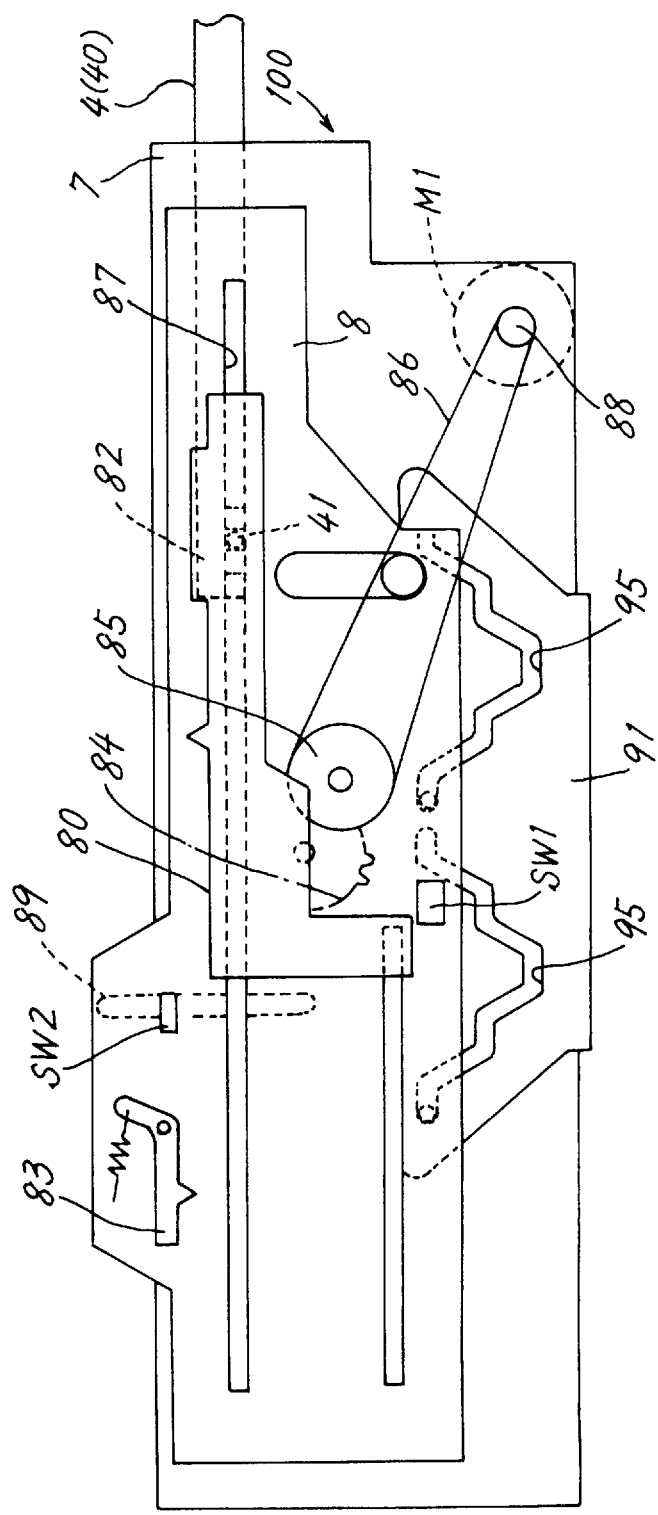
FIG. 7 is a view showing the same in an open position.

Tray Opening-Closing Mechanism FIGS. 6 and 7 are left side elevations of the mechanical deck 100. For convenience of description, the highest tray 4 only is shown.

The opening-closing slide 80 is fitted in the guide slot 87 of the support bracket 8 forwardly and rearwardly movably. The motor M1 is attached to the inner side of the side plate 7 and has a rotary shaft 88 projecting outward and coupled to a rack (not shown) of the slide 80 by a belt 86, pulley 85 and intermediate gear 84.

The path of movement of the slide 80 is provided with the switch SW2, i.e., closed position sensor switch, and the switch SW1, i.e., open position sensor switch. The closed position sensor switch SW2 is pushed in by an upper end portion of the slide 80, and the open position sensor switch SW1 by a lower end portion of the slide 80.

The support bracket 8 is provided with a lock lever 83 opposed to the upper end portion of the slide 80 and biased counterclockwise by a spring. The lock lever 83 engages with the slide 80 as located in its closed position, preventing the slide 80 from being shifted by an external impact.

The guide bar 40 in engagement with the tray 4 has a projection 41 projecting outward from its front end. The slide 80 has an inward engaging claw 82 extending through the guide slot 87 of the support bracket 8 to engage with the projection 41 (see FIG. 27).

As seen in FIG. 6, the bracket 8 has a vertical groove 89 extending across the slot 87 at right angles therewith for the projection 41 to fit in. With the present embodiment, three trays 4 are provided, so that three guide bars 40 each having the projection 41 are used. In the closed position shown in FIG. 25, the projections 41 are in alignment as fitted in the vertical groove 89, whereby the bars 40 are prevented from being shifted forward or rearward by external vibration or shake.

Details of Tray

Figure 8A:
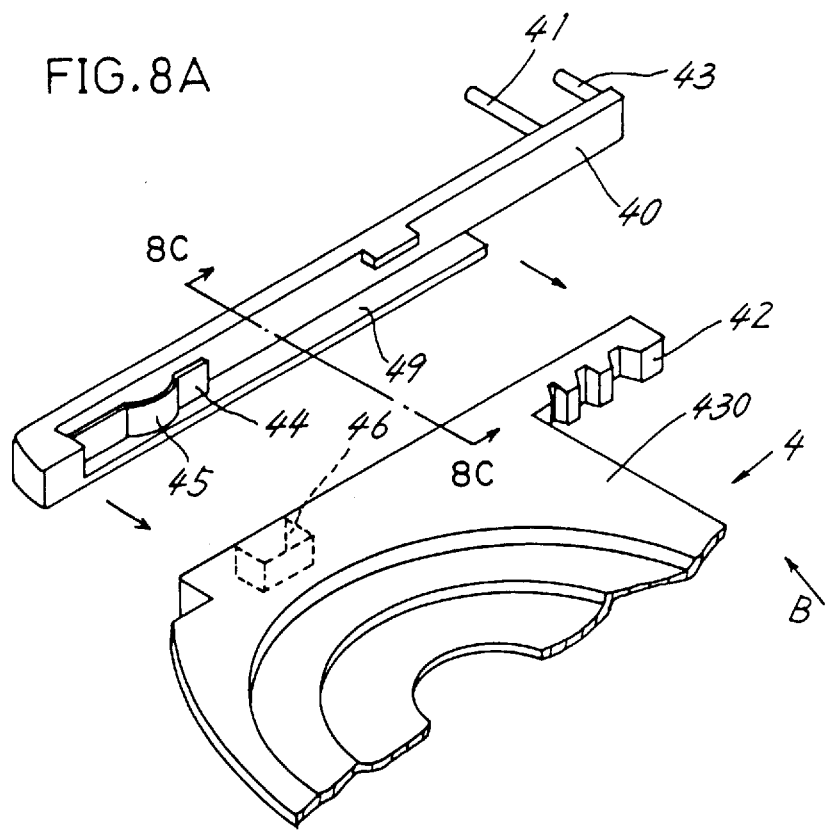
FIG. 8A is an exploded perspective view of a tray and a guide bar.
Figure 8B:
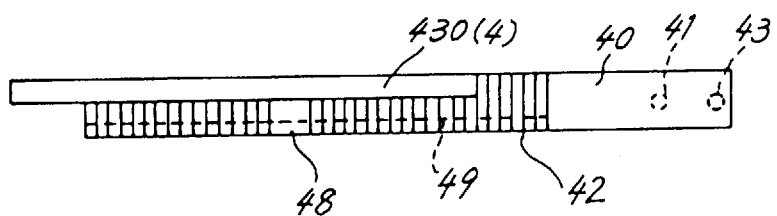
FIG. 8B is a view of the tray and the guide bar as assembled and seen in the direction of arrow B in FIG. 8A.
Figure 8C:
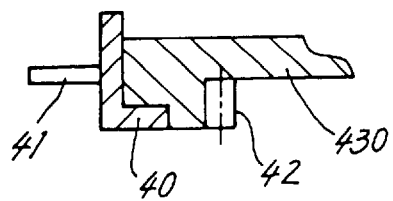
FIG. 8C is a view in section taken along the line 8C—8C in FIG. 8A.

The tray 4 and the guide bar 40 are so constructed as shown in FIGS. 8A, 8B and 8C. The bar 40 has an outward restraining pin 43 positioned toward the front beyond the projection 41. The restraining pin 43 comes into contact with the front end of the slotted portion 78 of the guide plate 77. The guide bar 40 has an inwardly projecting bearing wall 49 for supporting the tray 4, and a plate spring 44 supported at its one end by the inner side of a bar rear end portion. The plate spring 44 has a protrusion 45 at its middle portion, while the tray 4 is formed in a side portion thereof with a recess 46 for the protrusion 45 to fit in. The tray 4 is softly held to the guide bar 40 by the elastic force of the spring 44.

FIG. 8B is a view showing the tray 4 and the guide bar 40 as assembled and as seen in the direction of arrow B in FIG. 8A, and FIG. 8C is a view showing the same in section taken along the line 8C—8C in FIG. 8A. The rack 42 extends over the entire length of the tray 4, projects downward beyond the support plate 430 and has a bottom face flush with the lower surface of the bearing wall 49.

The rack 42 of the tray 4 has approximately at its center a large tooth 48 having a larger thickness than the other teeth. This makes the tray 4 immovable slidingly if the gear train 6 on the holder 5 is displaced relative to the rack 42 when these are assembled.

When a disk is to be placed on the tray 4, the motor M1 is first rotated in the closed position shown in FIG. 6 to move the opening-closing slide 80 rearward against the engagement thereof with the lock lever 83. The engagement of the projection 41 with the claw 82 shown in FIG. 27 slidingly moves the tray 4 with the guide bar 40 in the opening direction. When the slide 80 pushes in the open position sensor switch SW1 as seen in FIG. 7, the motor M1 is halted. The disk can be placed on the tray 4 in this state.

When the front panel 10 inputs a signal indicating that the disk is to be stowed in the stacker 74, the motor M1 rotates, moving the slide 80 forward. The tray 4 and the guide bar 40 also move forward. When the slide 80 pushes in the closed position sensor switch SW2, the motor M1 stops with the tray brought to the closed position.

Tray Loading Mechanism

Figure 11:
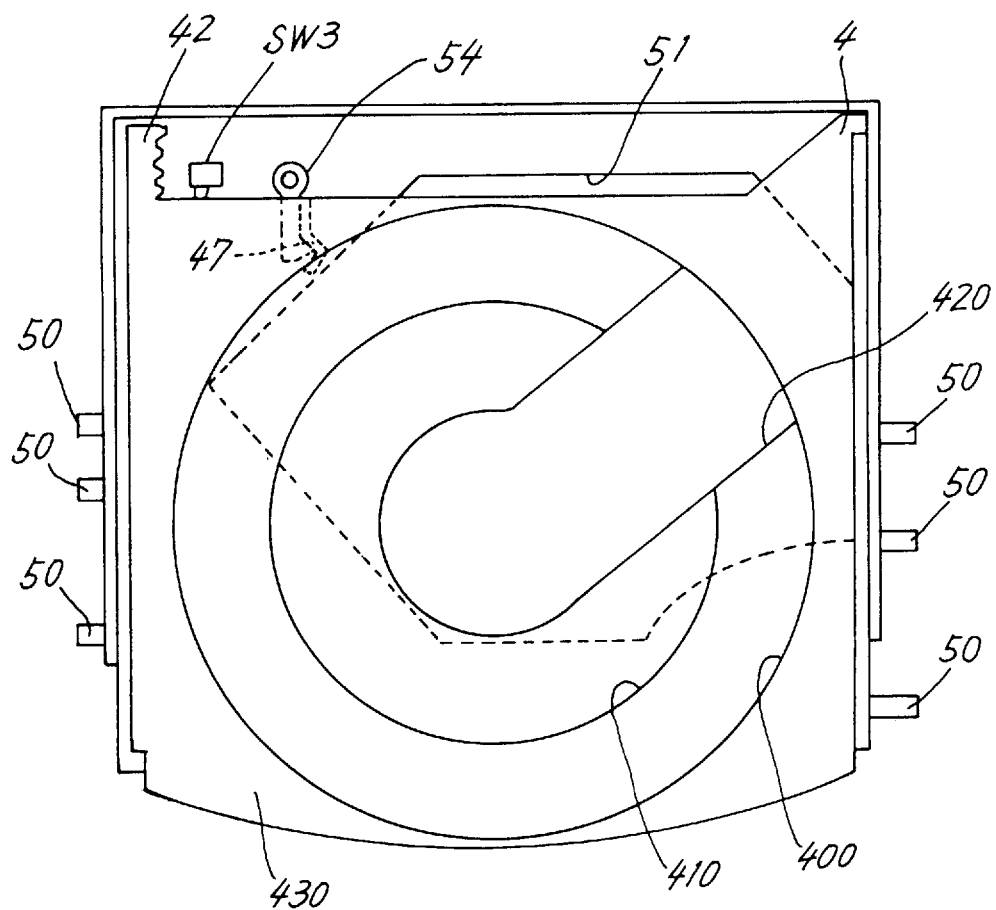
FIG. 11 is a plan view showing the relationship between the tray holder and the tray in a loading completed position.

FIG. 10 is a plan view showing the position relationship between the tray 4 in the closed position and the tray holder 5, and FIG. 11 is a plan view of the tray as completely loaded. For convenience of description, the side plates 7, 70 are not shown. The gear train 6 mounted on the tray holder 5 is operated by the motor M3 which is provided on the rear side of the tray holder 5. The gears included in the present embodiments and to be described below are all made from polyacetal or like synthetic resin. The gear train 6 includes at the downstream side a first gear 60 having a recess 62, i.e., a toothless peripheral portion. The forward end of the rack 42 of the guide bar 40 fits in the recess 62 in the closed position, i.e., unloaded position.

Figure 9A:
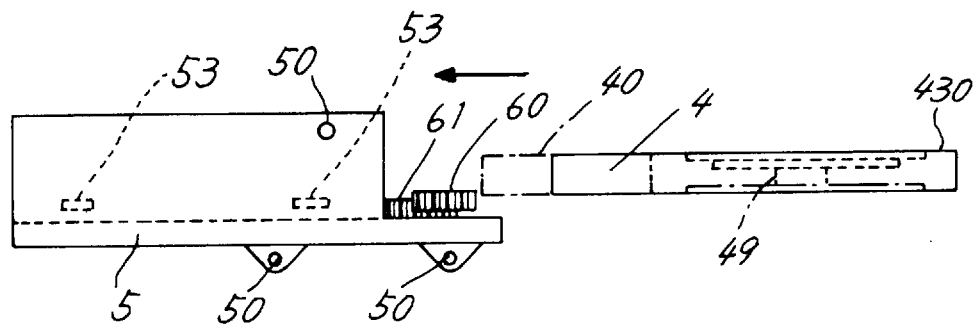
FIG. 9A is a side elevation of a tray holder and the tray.

FIG. 9A is a left side elevation of the tray holder 5 and the tray 4. Guide pieces 53 for supporting the tray 4 project inward from the side wall of the holder 5. The first gear 60 is in mesh with a second gear 61 and has an upper surface higher than the upper surface of the second gear 61. The tray 4 slides along with the bottom of the rack 42 supported by the guide pieces 53 and fitting to the top of the first gear 60. The bottom of the tray rack 42 is lower than the lower surface of the support plate 430 as previously stated, and the plate 430 moves past the gear train 6 thereabove without coming contact with the ear train.

Figure 16:
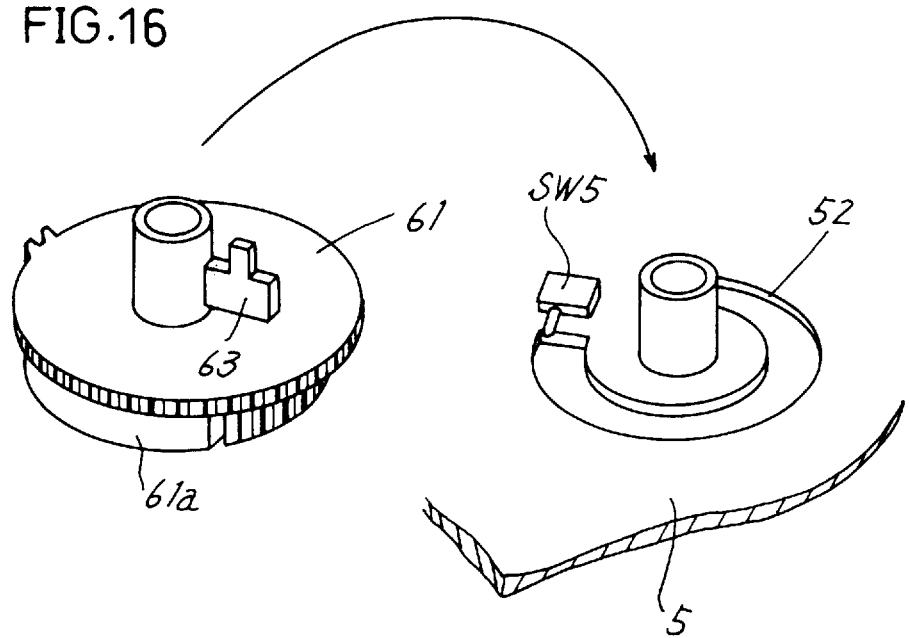
FIG. 16 is a perspective view showing how to mount a second gear on the tray holder.

As shown in FIGS. 10 and 16, the second gear 61 has a contact wall 63 on its bottom face. A circular-arc groove 52 is formed in the upper surface of the tray holder 5. The gear 61 is rotatable with the lower end of the contact wall 63 fitting in the groove 52. The switch SW5 serving as an unloading sensor switch is provided at one end of path of revolution of the contact wall 63 on the holder 5.

The gear train 6 is so assembled that the contact wall 63 of the second gear 61 bears against the clockwise end of the grooved portion 52 to push in the unloading sensor switch SW5, with the recess 62 of the first gear 60 directed outward. The peripheral portion 61a of the second gear 61 where the gear 61 meshes with the first gear 60 is toothed only locally to provide a Geneva means. This prevents the tray 4 from slidingly moving in excess of a proper amount even if the motor M3 rotates excessively for one cause or another.

The switch SW3 serving as a loading sensor and to be pushed in by the front end of the tray 4 is provided in an inner portion of the tray holder 5. A latch lever 54 biased counterclockwise by a spring is disposed at one side of the switch SW3, while a cavity 47 is formed in the lower surface of the support plate 430 and positioned in corresponding relation with the latch lever 54. The engagement of the lever 54 in the cavity 47 prevents the tray 4 as loaded completely from being displaced by external vibration.

Figure 9B:
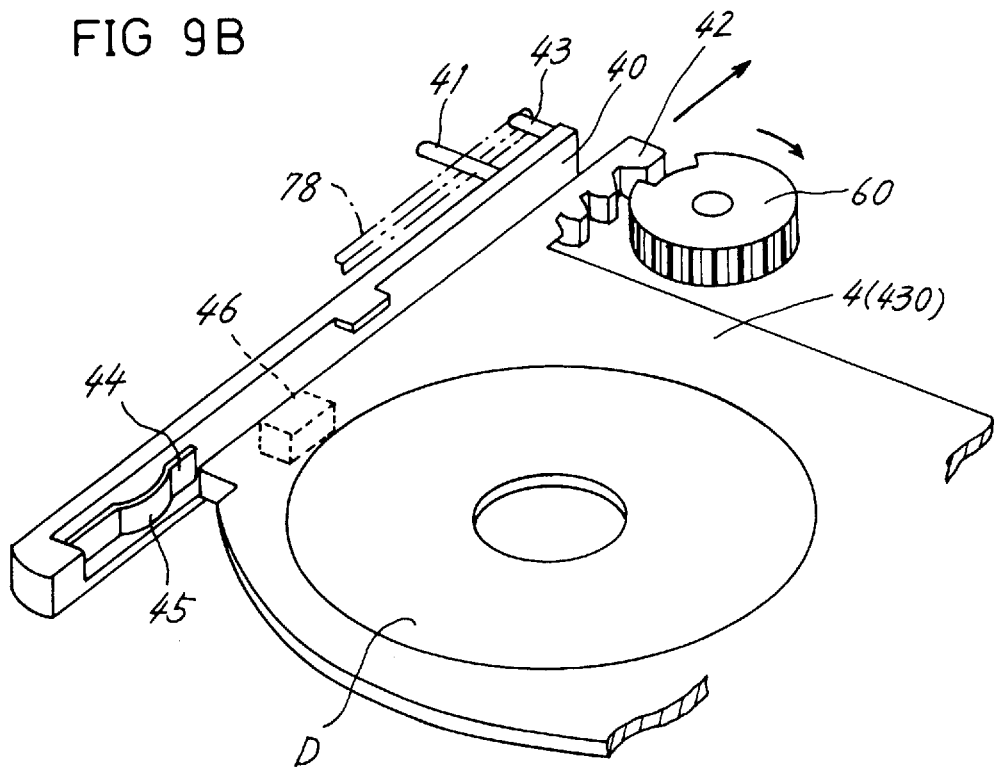
FIG. 9B is a perspective view showing the tray as released from the guide bar for loading.

For loading, the motor M3 is energized, rotating the first gear 60 clockwise and causing the end of recessed portion 62 of the gear 60 to kick out the end of rack 42 of the tray 4. The rack 42 meshes with the first gear 60 to draw the guide bar 40 and the tray 4 forward. However, since the restraining pin 43 is in contact with the front end of the slotted portion 78 of the guide plate 77, the guide bar 40 is restrained from movement, and the tray 4 softly held to the bar 40 by the plate spring 44 is released therefrom, with the result that the tray 4 only slidingly moves forward as seen in FIG. 9B.

The first gear 50 rotates one turn, permitting the large tooth 48 shown in FIG. 10 to fit in the recess 62, further moves the rack 42 forward for the tray 4 to advance by being guided by the guide pieces 53. The tray 4 presses the loading sensor switch SW3 as shown in FIG. 11, whereupon the motor M3 is deenergized. In this state, the tray 4 is vertically movable with the holder 5.

If the contact wall 63 fails to depress the unloading sensor switch SW5 in the closed position because the second gear 61 is mounted as displaced, the large tooth 48 does not fit in the recess 62 during the rotation of the first gear 60, and the tray can not be loaded. This indicates that the second gear 61 is not mounted in place.

Tray Raising-Lowering Mechanism

The tray holder 5 is moved upward or downward along the cam grooves 93, 94 by the forward or rearward movement of the second and first slide members 90, 9. Accordingly, the tray 4 moves upward or downward as supported by the holder 5 between the loading completed position and the optical head base 27. The second and first slide members 90, 9 are driven by a gear mechanism 3 provided on the chassis 2. A detailed description will be given below.

Figure 12A:
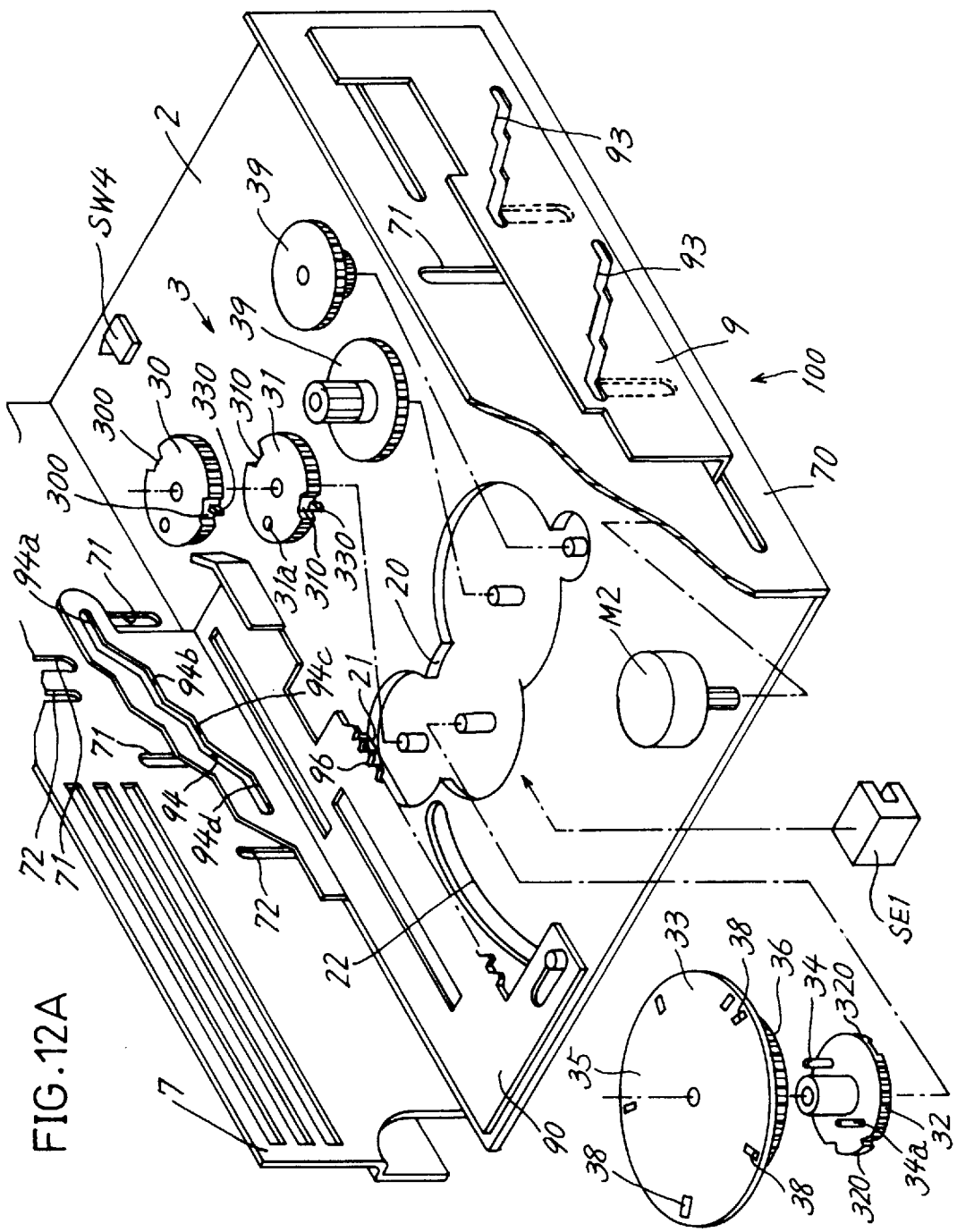
FIG. 12A is an exploded perspective view of a lift mechanism for the tray holder.
Figure 13:
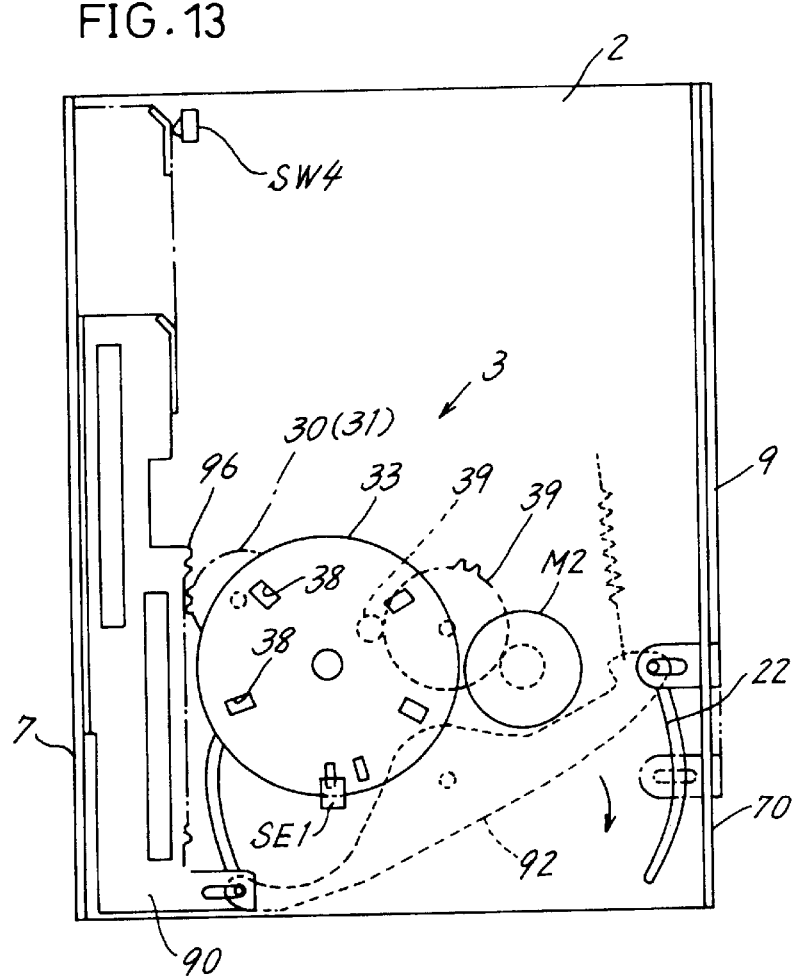
FIG. 13 is a plan view of the same.

FIG. 12A is a perspective view showing the mechanical deck 100 except the tray 4 and the head base 27. FIG. 13 is a plan view of the mechanism for slidingly moving the first and second slide members 9, 90. The gear mechanism 3, which is coupled to the motor M3 is mounted on the chassis 2 and disposed slightly rearward from its central portion. The gear mechanism 3 is fitted in a recessed portion 20 formed in the chassis 2. Two gears 30, 31 are rotatably superposed at the downstream end of the mechanism 3.

The upper gear 30 meshes with a rack 96 formed at the inner edge of horizontal portion of the second slide member 90. The lower gear 31 meshes with a rack 97 of the third slide member 91 as will be described later. The gear 31 has a position determining reference hole 31a for use in mounting the gear on the chassis 2.

A drive gear 32 meshing with the lower gear 31 has two positioning projections 34, 34a on its upper side. A control gear 33 is fitted to the positioning projections 34, 34a. The projections 34, 34a are different in diameter. This eliminates the likelihood that the control gear 33 will be mounted as displaced from the proper position. Six detection holes 38 are formed in the control gear 33 close to its periphery on a circle concentric with the gear.

Figure 14:
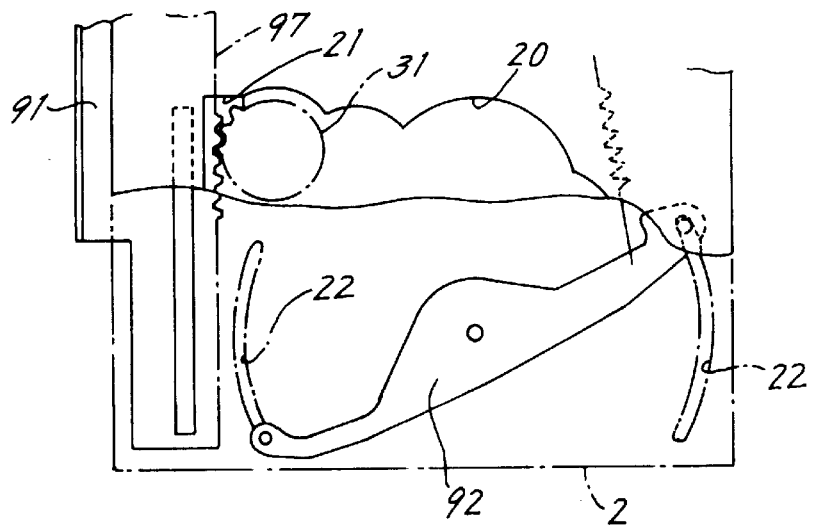
FIG. 14 is a view showing the same with a chassis partly broken away.

The left end of the recessed portion 20 of the chassis 2 is formed with an opening 21, from which the lower gear 31 is exposed. As shown in FIG. 14, the third slide member 91 is positioned away from the path of rotation of the pivotal lever 92. The lower gear 31 meshes with the third slide member 91.

The chassis 2 is formed with circular-arc slots 22, 22 corresponding respectively to opposite ends of the pivotal lever 92. The lever ends extend through the slots 22, 22 and are fitted to the first and second slide members 9, 90, respectively. The lever 92 is biased counterclockwise, biasing the first slide member 9 forward and the second slide member 90 rearward.

With reference to FIG. 12A, the sensor SE1 comprising a photocoupler is mounted on the chassis 2 so as to permit the detection holes 38 in the control gear 33 to pass therethrough. The sensor SE1 counts up detection holes 38 passing therethrough during the rotation of the control gear 33. The processor 200 shown in FIG. 1 reads the count data to temporarily store the data in a memory therein and detect the rotated position of the control gear 33. The sliding movement of the first and second slide members 9, 90 is controlled according to the angle of rotation of the control gear 33 detected by the sensor SE1.

The motor M2, mounted on the chassis 2, is coupled to the control gear 33 by two intermediate gears 39, 39. The switch SW4, i.e., playback sensor switch, is disposed at the terminal of path of movement of the second slide member 90 on the rear portion of the chassis 2. When the switch SW4 is pushed in by the end of the second slide member 90, the motor M2 is halted.

Figure 15:
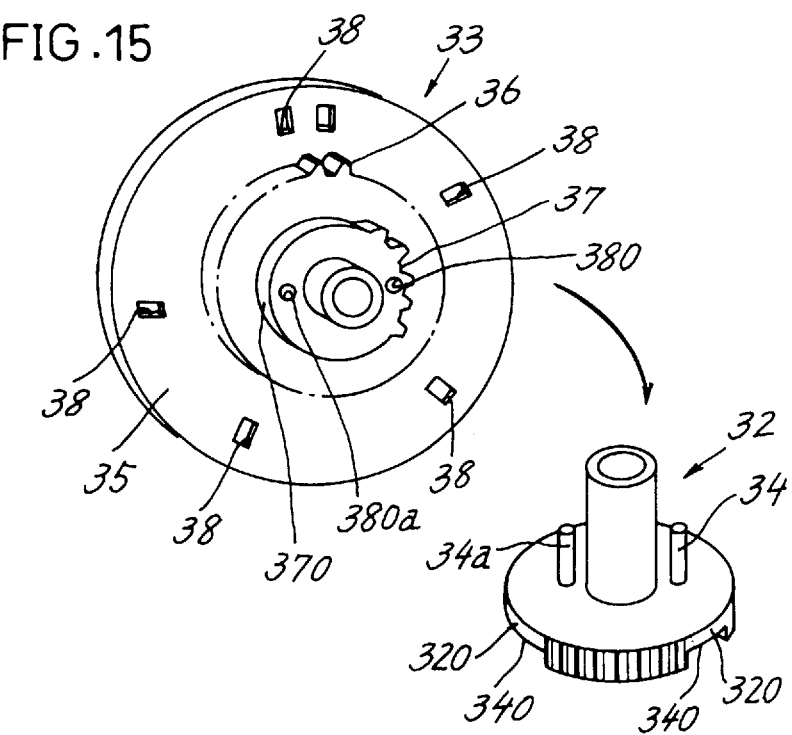
FIG. 15 is a perspective view of the control gear and a drive gear.

With reference to FIGS. 12A and 15, the control gear 33 comprises three components in layers, i.e., a large gear 36 and a small gear 37 arranged under a flange 35. The aforementioned detection holes 38 are formed in the flange 35. Bores 380, 380a for the positioning projections 34, 34a of the drive gear 32 to fit in are formed in the bottom of the small gear 37. The small gear 37 is in mesh with the upper gear 30 and has a toothless play face 370 along part of its periphery.

The drive gear 32 has at two portions of its periphery toothless play faces 320, 320 which are away from each other. Each play face 320 has a relief cavity 340 at its lower portion.

Each of the gears 30, 31 has recessed faces 300 or 310 at two portions of its periphery. Each of the recessed faces 300, 310 has a kickout tooth 330 at its lower end portion. The kickout tooth 330 of the gear 30 is kicked by the small gear 37. The kickout tooth 330 of the gear 31 fits in the relief cavity 340 of the drive gear 32. The play faces 320, 370 of the drive gear 32 and the small gear 37 each provide a Geneva means when fitting to the gear 31 or 30 opposed thereto.

The cam groove 94 formed in the vertical wall of the second slide member 90 includes four horizontal portions 94d, 9cd, 94d, 94a increasing stepwise in height toward the front, and intervening slanting portions in communication therewith. The cam grooves 93 of the first slide member 9 are shaped in reverse relation with the cam groove 94 with respect to the front-rear direction. Accordingly, when the rotation of the motor M2 moves the second slide member 90 forward through the gear mechanism 3, the first slide member 9 moves rearward, with the result that the tray holder 5 fitting in the cam grooves 94, 93 descends.

With reference to FIGS. 12A, 17 and 18, the four horizontal portions 94d, 94c, 94b, 94a correspond to the level positions of the three trays 4 and the position of the tray holder 5 as placed on the optical head base 27. More specifically, when the pin 50 of the holder 5 is in engagement with the horizontal portion 94a at the highest position as seen in FIG. 17A, the holder 5 is opposed to the tray 4 at the highest position. At this time, the control gear 33 is so positioned that the detection hole 38 providing a reference point for detecting rotated positions is opposed to the sensor SE1 as shown in FIG. 17B.

FIG. 24 shows the relationship between the angle of rotation of the control gear 33 and the level position of the holder 5. When the control gear 33 rotates through 76.2 deg or 139.4 deg from the reference position, the pin 50 of the holder 5 fits in the horizontal portion 94b or 94c, respectively. When the control gear 33 rotates through 220.5 deg from the reference position, the pin 50 fits in the lowest horizontal portion 94d as seen in FIG. 18A, and the tray holder 5 reaches the head base 27 and is in the playback position.

Support Bracket Lift Mechanism

The gear mechanism 3 is mounted on the chassis 2 in the following manner.

Figure 19A:
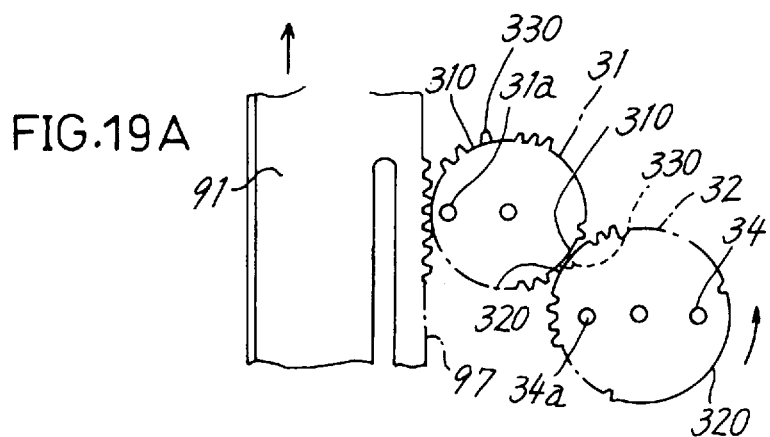
FIGS. 19A, 19B and 19C are plan views showing an intermittent movement of a third slide member.

As seen in FIG. 19A, the third slide member 91 is drawn rearward, and the lower gear 31 is mounted with its reference hole 31a opposed to the rack 97. At this time, the recessed faces 310, 310 of the gear 31 do not face the rack 97 of the third slide member 91, and one of the kickout teeth 330 is positioned close to the location where the drive gear 32 is to be mounted.

Next, the drive gear 32 is mounted with one of the play faces 320 opposed to the kickout tooth 330. The tooth 330 fits in the relief cavity 340 of the drive gear 32. At this time, the positioning projections 34, 34a are on a line orthogonal to the front-rear direction.

Figure 12B:
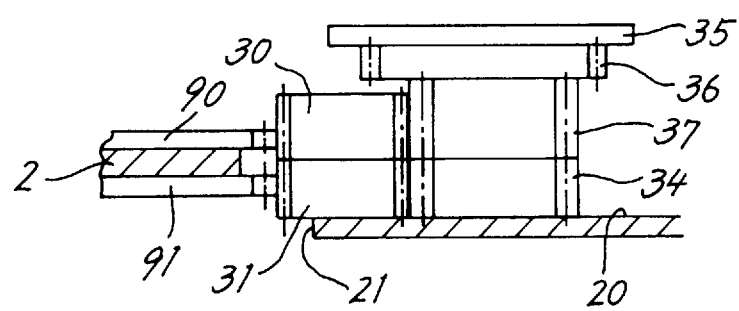
FIG. 12B is a view showing the position relationship between a control gear and upper and lower gears.
Figure 20A:
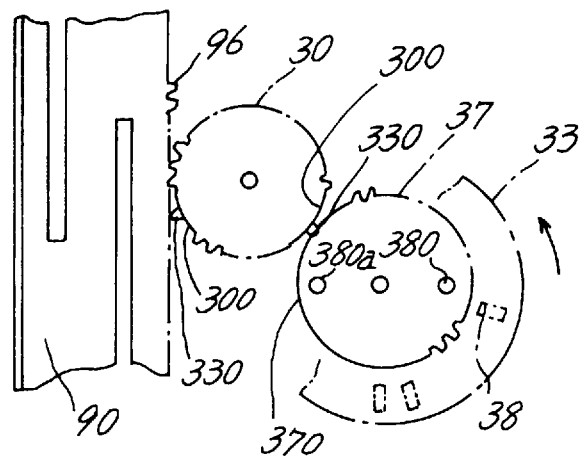
FIGS. 20A and 20B are plan views showing movement of a second slide member.

As shown in FIG. 20A, the second slide member 90 is thereafter drawn in, and the upper gear 30 is mounted as meshed with the rack 96. One of the kickout teeth 330 of the gear 30 is close to the position where the control gear 33 is to be mounted. The control gear 33 is subsequently mounted with the positioning projections 34, 34a fitting in the bores 380, 380a. At this time, the clockwise end of the play face 370 is opposed to the kickout tooth 330. FIG. 12B shows the position relationship of the gears 30, 31 with the control gear 33 and the drive gear 32.

When the motor M2 rotates, rotating the control gear 33 counterclockwise, the play face 370 moves out of opposed relation with the recessed face 300 of the gear 30. The small gear 37 of the control gear 33 kicks the kickout tooth 330 of the upper gear 30, rotating the gear 30 clockwise. The gear 30 rotates in meshing engagement with the small gear 37 of the control gear 33. Since the control gear 33 is coupled with the drive gear 32 by the positioning projections 34, 34a, the gear 31 in mesh with the drive gear 32 also rotates clockwise. The second and third slide members 90, 91 advance at the same speed. The support bracket 8 and the tray holder 5 start to descend.

Figure 19B:
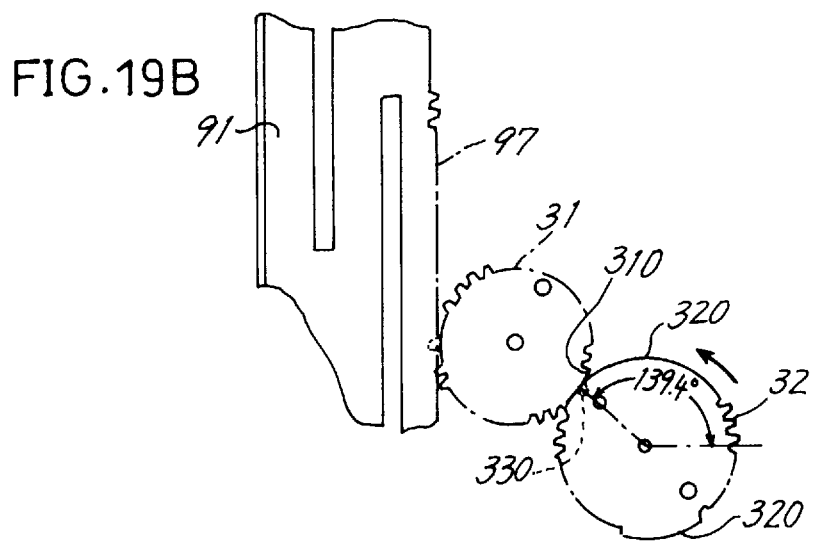

The rotation of the control gear 33 through 139.4 deg from the reference position moves down the tray holder 5 to the position opposed to the lowermost tray 4, whereupon the play face 320 of the drive gear 32 is opposed to the recessed face 310 of the lower gear 31 to interrupt the rotation of the gear 31 as shown in FIG. 19B. Consequently, the third slide member 91 temporarily stops.

Figure 20B:
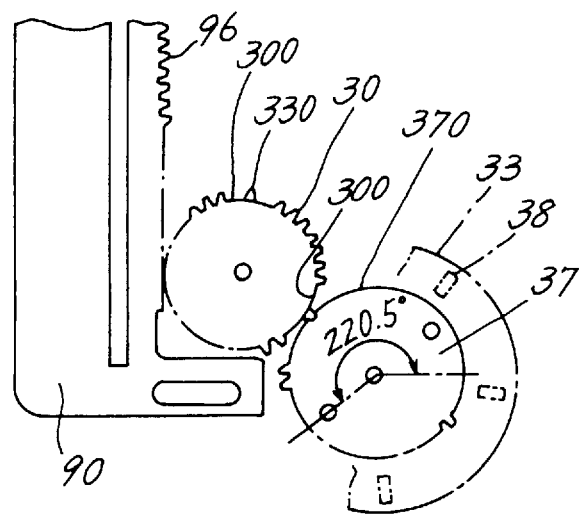

The control gear 33 continues to rotate, rotating the upper gear 30 and advancing the second slide member 90. With reference to FIG. 20B, when the control gear 33 rotates through 220.5 deg, bringing the tray holder 5 into contact with the head base 27, the small gear 37 of the control gear 33 moves out of meshing engagement with the upper gear 30, and the play face 370 of the small gear 37 is opposed to the recessed face 300 of the upper gear 30. The second slide member 90 therefore stops advancing. The second slide member 90 does not advance thereafter despite the rotation of the control gear 33 in the counterclockwise direction.

Figure 19C:
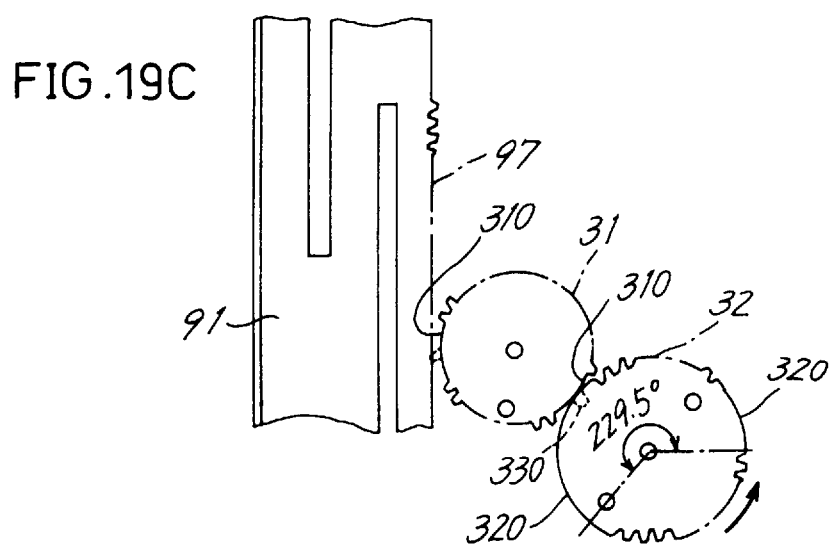

The drive gear 32 in this state further rotates through 9 deg, whereupon the play face 320 of the drive gear 32 moves out of opposed relation with the gear 31 as seen in FIG. 19C, and the gear 32 starts to mesh with the gear 31, advancing the third slide member 91 again. When the control gear 33 rotates through 344.6 deg from the reference position, the sensor SE1 detects the detection hole 38, whereupon the motor M2 is deenergized (see FIG. 23B).

Thus, the third slide member 91 is held out of sliding movement while the tray holder 5 moves from the position opposed to the lowest tray 4 to the position wherein the holder comes into contact with the head base 27. The slide member 91 slidingly moves after the holder 5 has reached the base 27. The intermittent drive thus effected is intended to move the support bracket 8 upward and downward with the holder 5 retained at the position of the head base 27. This movement will be described in detail.

Tray Opening and Closing in Playback State

As previously stated with reference to FIG. 4, of the three pins 81, 81, 81 projecting from the support bracket 8, the two lower pins 81, 81 extend through the cam grooves 95, 95 of the third slide member 91 and fit in the second vertical slots 72, 72 of the side plate 7. The other pin 81 fits directly in the other second vertical slot 72, and the support bracket 8 is allowed to move upward and downward only.

With reference to FIG. 21, each of the cam grooves 95 comprises a front half including three horizontal portions 95c, 95b, 95a increasing stepwise in height toward the front and slanting portions interconnecting these portions, and a rear half continuous with the front half and having a shape reverse to that of the front half with respect to the front-rear direction. The cam groove is generally V-shaped. The slanting groove portions have the same inclination as those of the cam grooves 93, 94 of the first and second slide members 9, 90.

The three horizontal portions 95c, 95b, 95a correspond to the level positions of the three trays 4, 4, 4. Thus, as is the case with the first and second slide members 9, 90, the portion 95a at the highest level corresponds to the tray 4 at the highest level, and the lowest portion 95c to the lowest tray 4.

Until the control gear 33 rotates through 139.4 deg from the reference position, the second and third slide members

90, 91 advance at the same time as already stated, so that the two slide members 90, 91 remain unchanged in position relative to each other. Accordingly, the support bracket 8 descends with the tray holder 5 along the cam grooves 95, 95.

Figure 22:
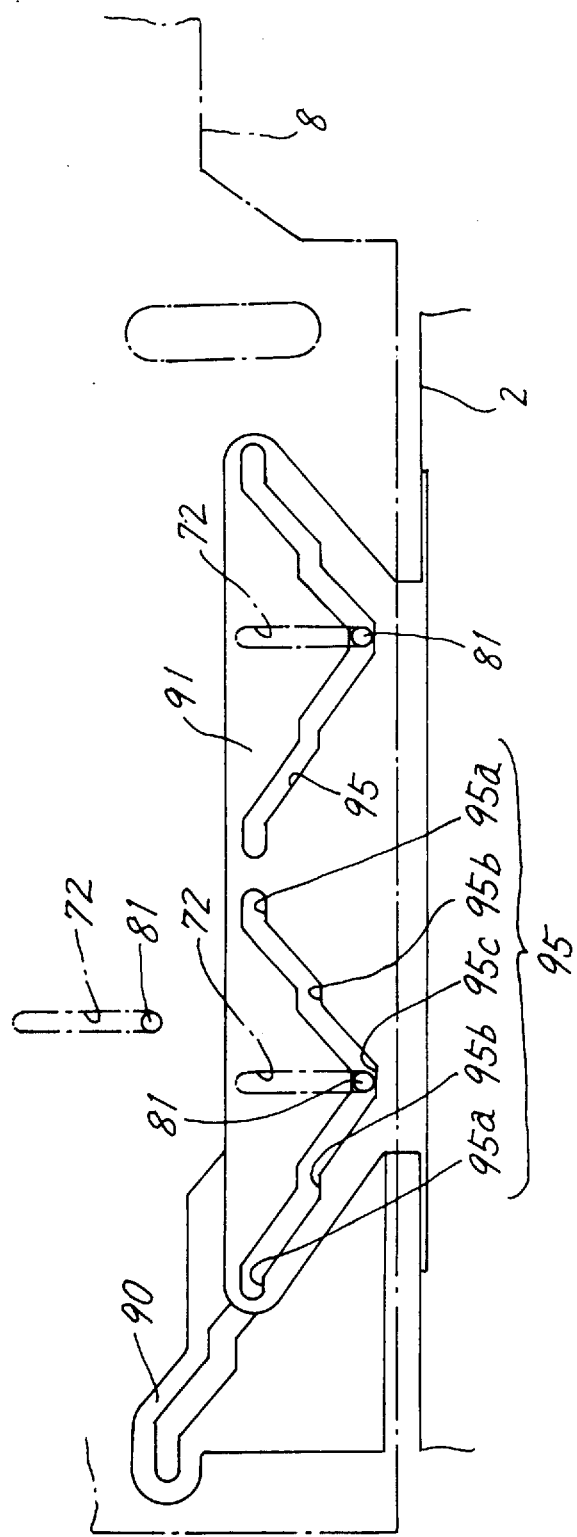
FIG. 22 is a left side elevation showing the second slide member as completely advanced from the above position.

Upon the angle of rotation of the control gear 33 exceeding 139.4 deg, the second slide member 90 only advances with the third slide 91 halted. The support bracket 8 stops descending, and the lower pins 81 remain in the lowest horizontal portions 95c as seen in FIG. 22.

When the control gear 33 rotates through 220.5 deg from the reference position, the second slide member 90 comes to a halt as stated previously. When the gear further rotates through 9 deg, the third slide member 91 advances with the second slide member 90 at a halt.

Figures 23A, 23B:
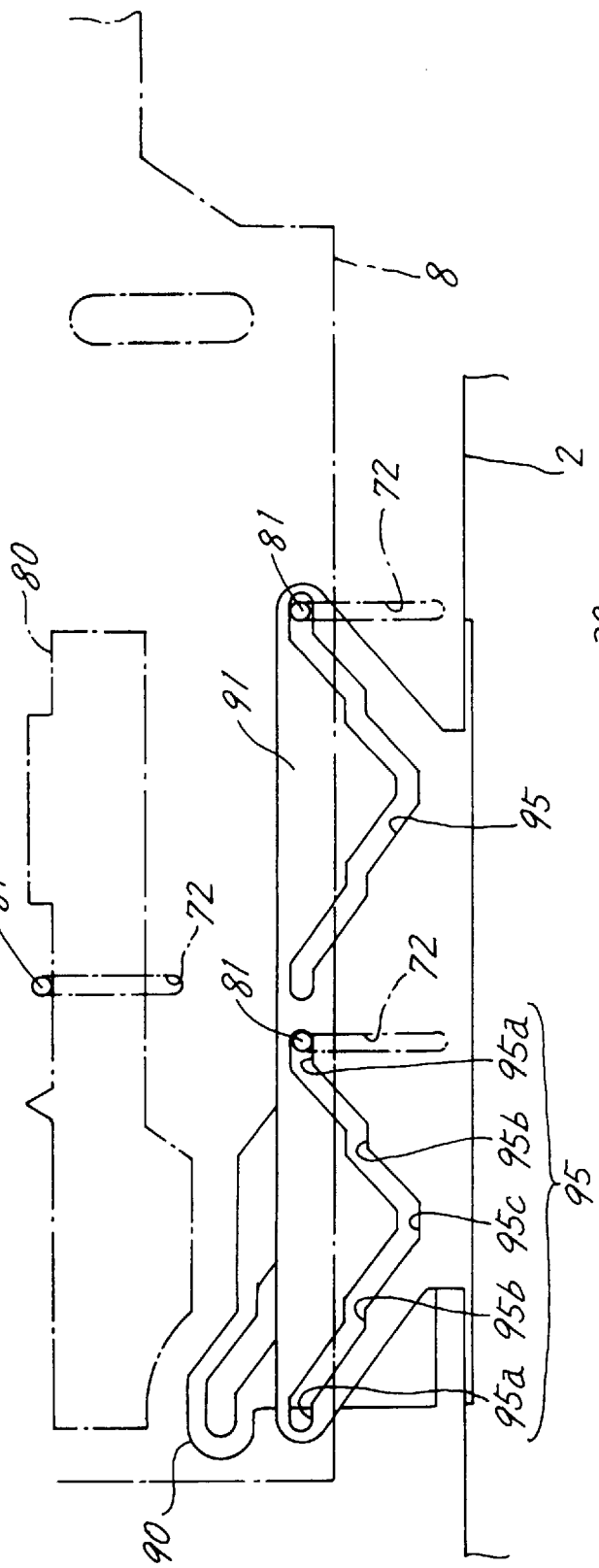
FIG. 23A is a left side elevation showing the third slide member as completely advanced from the above position.
FIG. 23B is a view showing the control gear as rotated at this time.

With the tray holder 5 completely lowered, the support bracket 8 having the pins 81 fitted in the lowest horizontal portions 95c moves up again. The sensor SE1 detects the rotated position of the control gear 33. When the gear rotates through 344.6 deg from the reference position, the sensor SE1 detects the passage of the detection hole 38 which is remotest from the reference position in the clockwise direction as shown in FIG. 23B, whereupon the motor M2 stops rotating. At this time, the pins 81 of the bracket 8 are in the highest horizontal portions 95a as seen in FIG. 23A.

Figure 25:
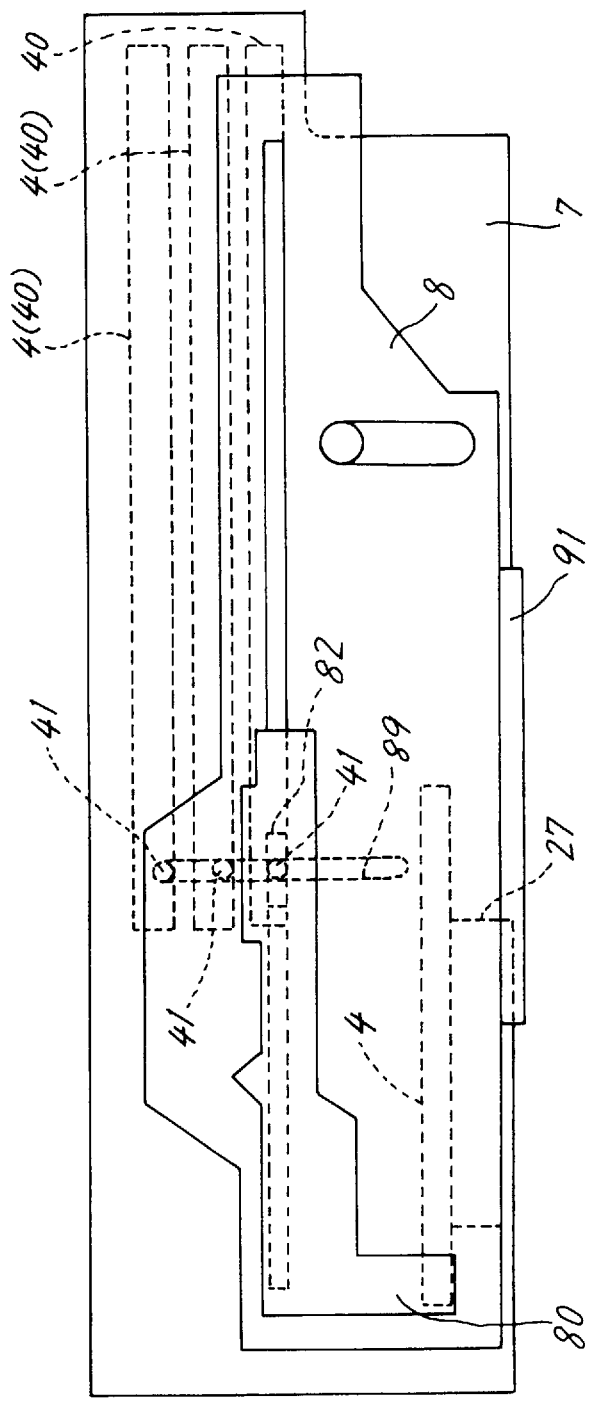
FIG. 25 is left side elevation showing the support bracket as positioned for the lowermost tray.
Figure 27:
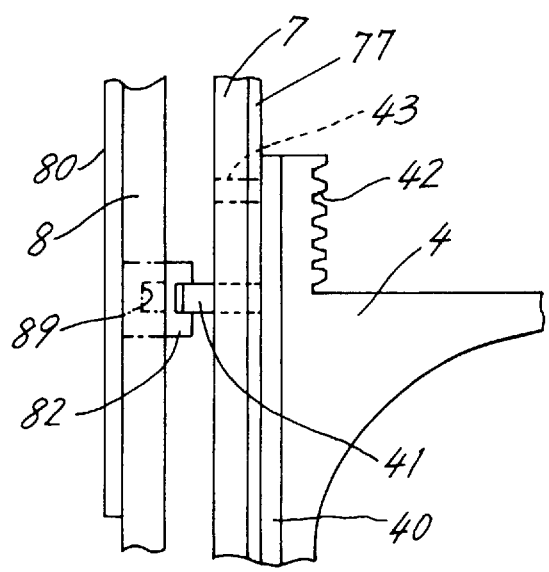
FIG. 27 is a plan view showing a projection in engagement with an engaging claw.

As already stated, the bracket 8 is provided with the opening-closing slide 80, the engaging claw 82 of which is in engagement with the projection 41 of the guide bar 40 connected to the tray 4 (see FIGS. 25 and 27). Accordingly, the tray 4 to be selected by the slide 80 is changeable by moving the bracket 8 upward or downward.

According to the present embodiment, even during disk playback with the tray holder 5 opposed to the head base 27, further advance of the third slide member 91 raises the support bracket 8, and a disk can be taken out by operating the slide 80.

The operations of mechanisms described will be described below.

Opening and Closing (see FIGS. 3 and 5 to 7)

When a disk is to be inserted into the mechanical deck 100 from outside, the open-close button 13 is manipulated first. The motor M1 rotates, and the meshing engagement of the rack of the slide 80 with the intermediate gear 84 retracts the slide 80 to move the tray 4 and the guide bar 40 to the disk discharge position. When the slide 80 depresses the open position sensor switch SW1, the motor M1 comes to a halt.

The user places the disk on the tray 4 and manipulates the open-close button 13 again, whereon the motor M1 reversely rotates, advancing the slide 80 to stow the tray 4 in the stacker 74. Depression of the closed position sensor switch SW2 by the slide 80 stops the motor M1. The tray 4 is in its closed position as accommodated in the stacker 74.

Loading (see FIGS. 10 and 11)

Next, when the disk stowed in the stacker 74 is to be played back, the playback button 11 is pushed. The motor M3 rotates, and the rotation of the second gear 61 of the gear train 6 turns off the unloading sensor switch SW5. The tray 4 is released from the guide bar 40 and advances (see FIG. 9B). The front end of the tray 4 depresses the loading sensor switch SW3 to halt the motor M3 (FIG. 11). The tray 4 is supported by the guide pieces 53 on the holder 5 and completely loaded. The guide bar 40 is not loaded along with the tray 4 because if the bar 40 is loaded, there arises a need to load the slide 80 of the bracket 8 since the slide 80 is in engagement with the bar 40 as previously stated. This increases the overall size of the device longitudinally thereof.

Ascent and Descent (see FIGS. 12A to 15, 17 and 18)

The motor M2 then rotates, slidingly moving the first and second slide members 9, 90 in directions opposite to each other and lowering both the tray 4 and the tray holder 5 along the cam grooves 93, 94. The sensor SE1 counts up the passing detection holes 38 to recognize the level position of the holder 5. The second slide member 90 depresses the playback sensor switch SW4, and the sensor SE1 detects the holder 5 as brought to the position of the head base 27, whereupon the motor M2 is halted. The disk on the tray 4 is now ready for playback.

When a disk already stowed in the stacker 74 is to be played back, numerical buttons 15 are pressed to select the tray 4 carrying the disk to be played back. The processor 200 first checks whether the tray holder 5 is opposed to the desired tray 4 with reference to the count of detection holes 38 stored in its memory. If the holder is so positioned, the motor M3 is energized to load the tray 4. If otherwise, the motor M2 is rotated to move the holder 5 upward or downward and position the holder 5 at the same level as the desired tray 4. The motor M3 is then energized for loading the tray 4.

The same procedure as above is executed when the tray holder 5 alone is to be raised or lowered with the tray 4 unloaded.

Disk Takeout During Playback (see FIGS. 6, 7, 19, 20 and 23 to 26)

With the tray 4 and the holder 5 placed on the head base 27 during playback, another tray 4 can be taken out by the following procedure. First, the number of the disk to be taken out is input, and the open-close button 13 is then manipulated. For example, suppose the disk on the lowest tray 4 is played back, and the disk on the highest tray 4 is to be taken out.

Since the present embodiment has three trays 4, these trays 4 as arranged from above downward will be referred to as No. 1, No. 2 and No. 3.

The third slide member 91 remains at rest while the tray holder 5 moves from the position opposed to the tray No. 3 to the position of the head base 27, so that the pins 81 of the bracket 8 remain in the lowest horizontal portions 95c of the cam grooves 95 as shown in FIGS. 24 and 25. The trays No. 1 and No. 2 are restrained from backlashing longitudinally of the device by the corresponding projections 41 engaged in the vertical groove 89 of the support bracket 8.

In this state, the motor M2 is rotated to move the third slide member 91 in the loading direction, and the bracket 8 ascends along the cam grooves 95 as shown in FIGS. 24 and 26. With the rise of the bracket 8, the engaging pawl 82 in engagement with the projection 41 corresponding to the tray No. 3 disengages therefrom and moves up vertically. The sensor SE1 detects 344.6-deg rotation of the control gear 33, whereupon the sliding movement of the third slide member 91 discontinues, with the pins 81 fitting in the highest horizontal portions 95a of the cam grooves 95.

Since the projections 41 on the guide bars 40 are vertically aligned, the engaging claw 82 comes into engagement with the projection 41 corresponding to the tray No. 1 shown in FIG. 26. In this state, the slide 80 is slidingly moved toward the open position by driving the motor M1. The disk within the tray No. 1 can then be taken out. Thus, during the playback of one disk, another disk can be taken out.

Disk Takeout

After the playback of a disk, the disk is taken out by a procedure reverse to the above. When the disk played back is to be stowed in the stacker 74, the number of the tray 4 on which the disk was placed is input using numerical button 15, and the open-close button is pressed. If the control gear 33 has been rotated through at least 220.5 deg from the reference position, that is, if the tray holder 5 is at the position of the head base 27 with the support bracket 8 in a raised position, the motor M2 rotates to move the third slide member 91 rearward, and the support bracket 8 descends.

Further rotation of the motor M2 moves the first slide member 9 forward and the second slide member 90 rearward, and the playback sensor switch SW4 is turned off. The tray holder 5 moves up from the position of the head base 27. The sensor SE1 detects the holder 5 as brought to the level position where it is to be halted, whereupon the motor M2 is deenergized. The motor M3 is energized, returning the tray 4 to the closed position, whereupon the unloading sensor switch SW5 is depressed to stop the motor M3. During this unloading process, the gear train 6 is intermittently driven within a short period of time as will be described below to set the second gear 61 in position. The tray 4 is softly held to the guide bar 40 by the plate spring 44. The motor M1 rotates to slidingly move the tray 4 toward the disk discharge direction, and the slide 80 depresses the open position sensor switch SW1 to stop the motor M1. The disk can be taken out in this state.

(Control Operation)

The present invention is characterized also by the operation of controlling the foregoing embodiment of disk playback device, i.e., by positioning of the gear train 6 in the unloading process, recognition for the ascent and descent of the tray holder 5 and the procedure to be executed when the power source is turned on initially. These procedures will be described below. The motors and the switches are in the arrangement shown in FIG. 5.

Gear Train Positioning Procedure in Unloading

The unloading operation described is likely encounter the following problem.

Figure 33:
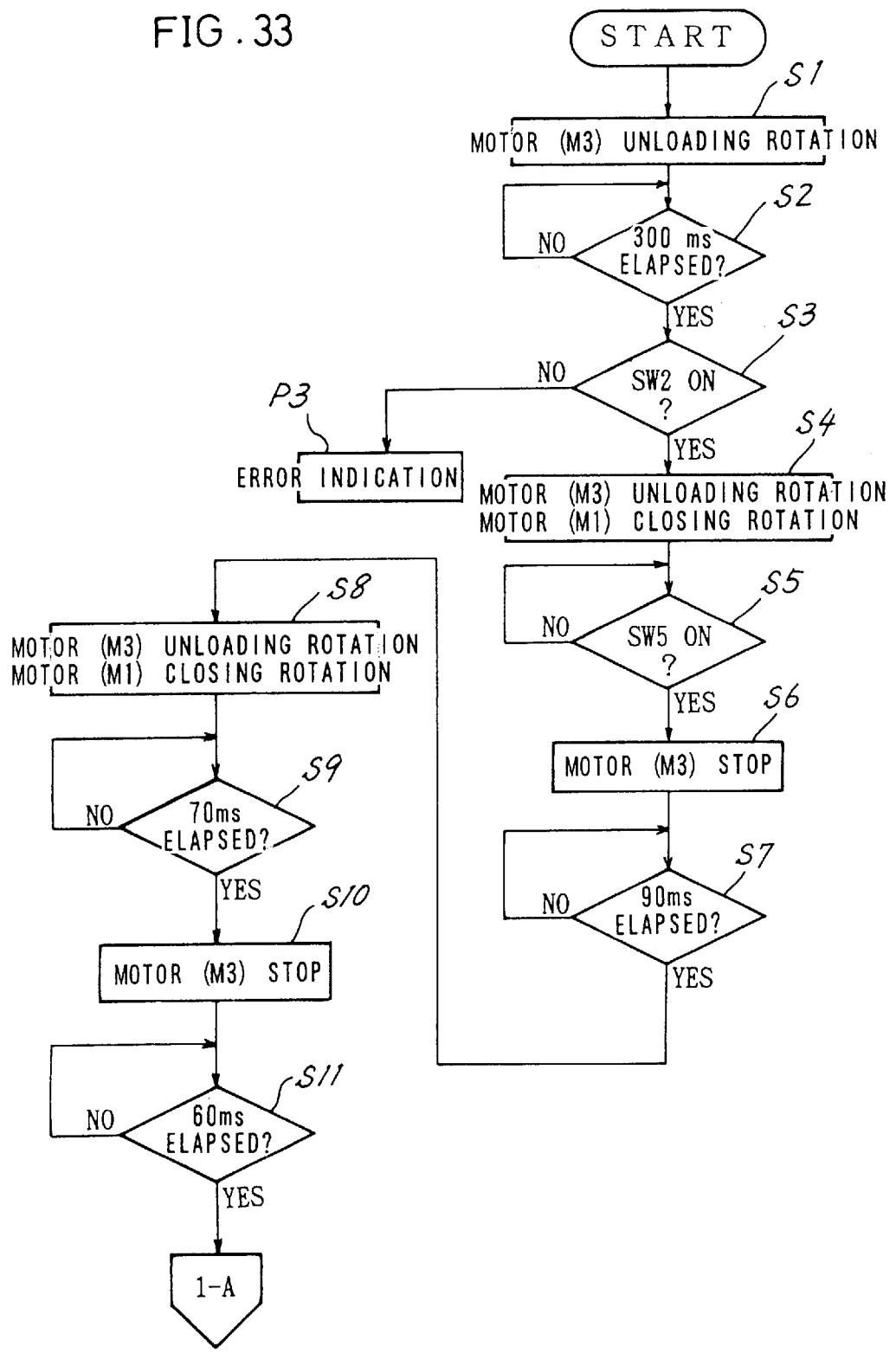
FIG. 33 is a flow chart showing a tray unloading procedure.
Figure 34:
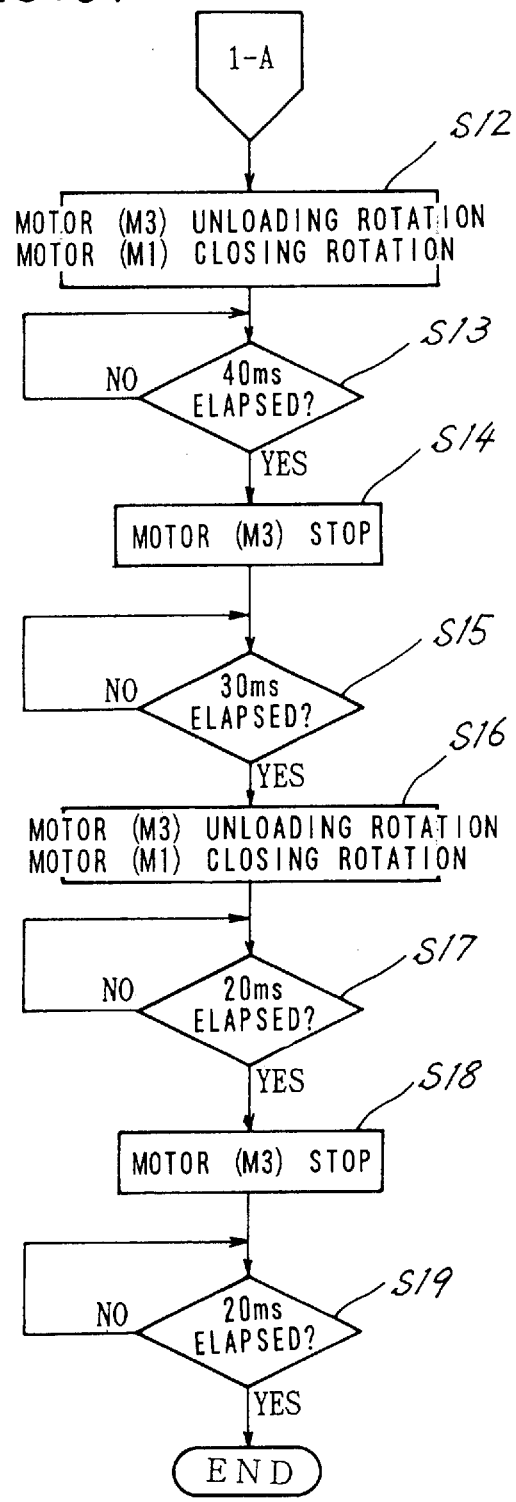
FIG. 34 is a flow chart showing the tray unloading procedure.

When the tray 4 is completely unloaded, the tray is out of engagement with the guide bar 40 as previously stated, and the plate spring 44 fits in the recess 46 immediately before completion of unloading to softly hold the tray 4 to the bar 40. However, when the guide bar 40 is free to slide rearward, the tray 4, upon coming into contact with the plate spring 44, slidingly moves the bar 40 rearward as it is and reaches the closed position without being held to the bar 40. If the motor M1 rotates in this state, moving the tray 4 and the guide bar 40 toward the closed position, the tray 4 fails to reach the proper closed position. Accordingly, the tray 4 must be held to the bar 40 reliably immediately before the tray is completely unloaded. For this purpose, the processor 200 carries out the control procedure shown in the flow charts of FIGS. 33 and 34.

First when starting unloading, the motor M3 is rotated in the unloading direction for 300 msec (S1, S2) to recognize that the closed position sensor switch SW2 is on (S3). It is likely that the tray holder 5 and the tray 4 are not in the proper level position for unloading due to a manipulation error of the user or error of the sensor SE1. The above steps prevent unloading of the tray so positioned. This operation will be described in detail.

Figure 31:
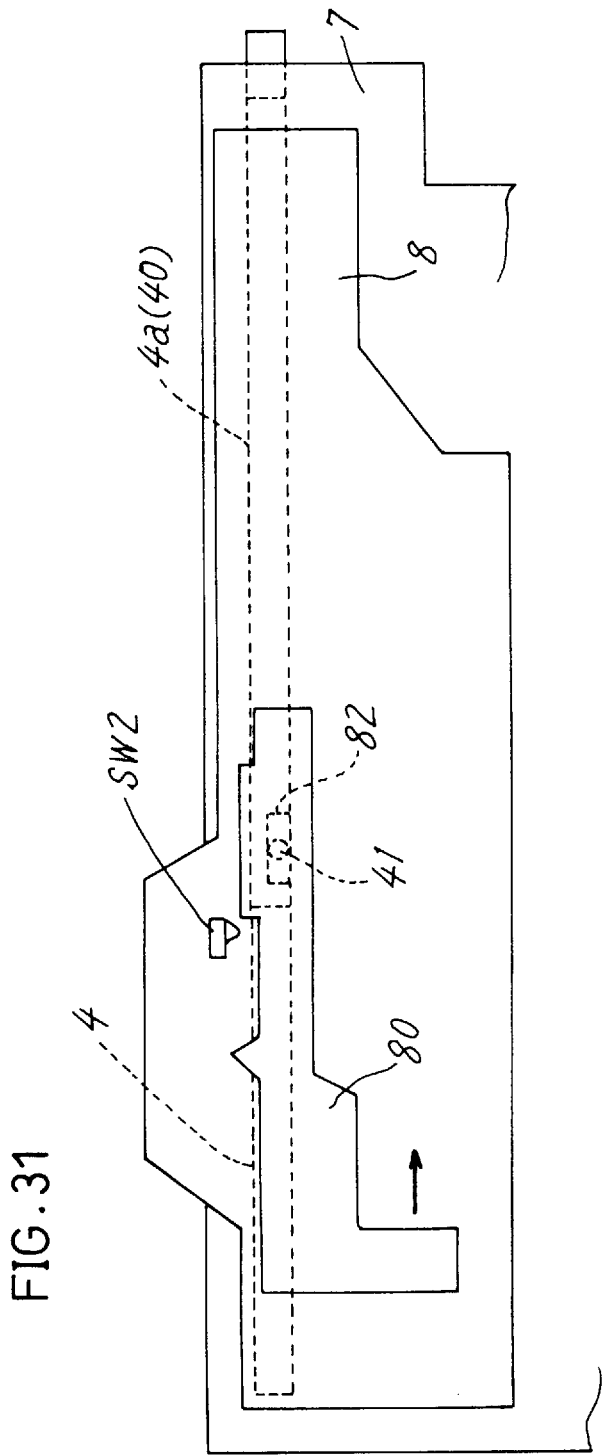
FIG. 31 is a left side elevation showing the tray in a wrong position and as unloaded.
Figure 32:
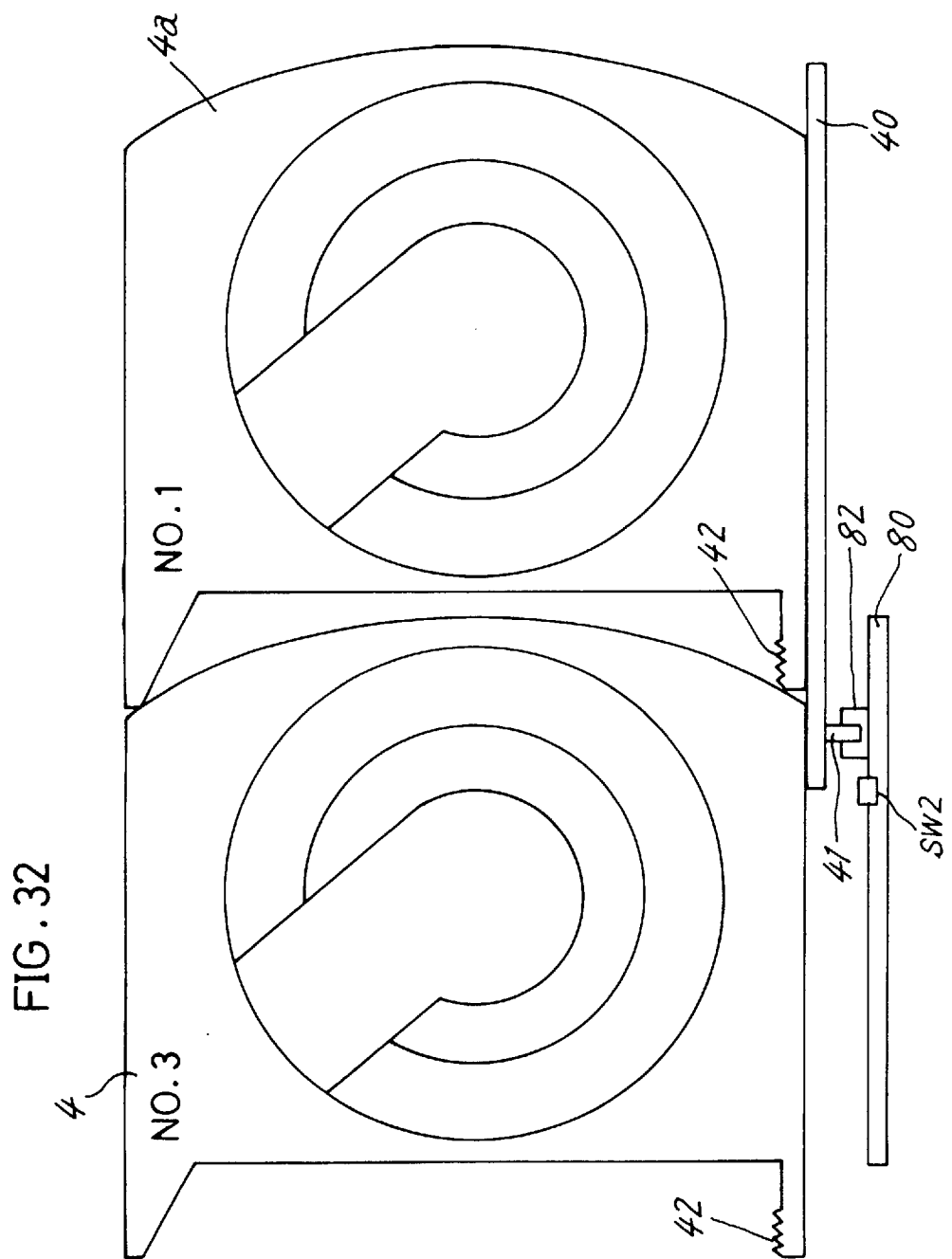
FIG. 32 is a plan view showing the same with the support bracket and the side plate omitted.

It is assumed that when the tray 4 to be stowed in the position, for example, of No. 3 is to be unloaded, the tray 4 is raised in error to the position corresponding to the tray No. 1 as shown in FIGS. 31 and 32. In step S1, the tray No. 3 to be unloaded collides with the tray 4a in the position of No. 1 and pushes the tray 4a rearward. Since the engaging claw 82 of the opening-closing slide 80 is in engagement with the projection 41 coupled to the tray No. 1, the tray 4 being unloaded rearwardly moves the slide 80 through the claw 82 and the projection 41. The closed position sensor switch SW2 is turned off. This indicates that the tray 4 being unloaded is not located at the proper level position. Since the tray 4 can not be unloaded in this case, the processor 200 indicates a mechanical error (P3).

The motor M3 is rotated for 300 msec in steps S1, S2 because rotation for this period is sufficient for checking the switch SW2 as to whether it is on or off.

In the case where the switch SW2 is found to be on in step S3, indicating that the tray No. 3 is located in the regular level position, the motor M1 is rotated to urge the slide 80 forward (S4). With the claw 82 in engagement with the projection 41, the guide bar 40 is biased forward, and the restraining pin 43 of the guide bar 40 comes into pressing contact with the front end of the slotted portion 78 of the guide plate 77 as shown in FIG. 9B. Thus, the motor M1 provides means for biasing the guide bar 40 in the loading direction. In this state, the motor M3 is driven to unload the tray 4 meshing with the gear grain 6. Since the guide bar 40 is prevented from sliding rearward by the rotational torque of the motor M1 in step S4, the tray 4 is unlikely to shift the guide bar 40 when coming into contact with the plate spring 44 on the bar 40. This ensures the engagement of the tray 4 with the spring 44.

The motor M3 and the gear train 6 further rotate, causing the contact wall 63 of the second gear 61 shown in FIG. 16 to depress the unloading sensor switch SW5, whereupon the motor M3 comes to a halt (S5, S6). The contact wall 63 bears on the end edge of the grooved portion 52.

Figure 39:
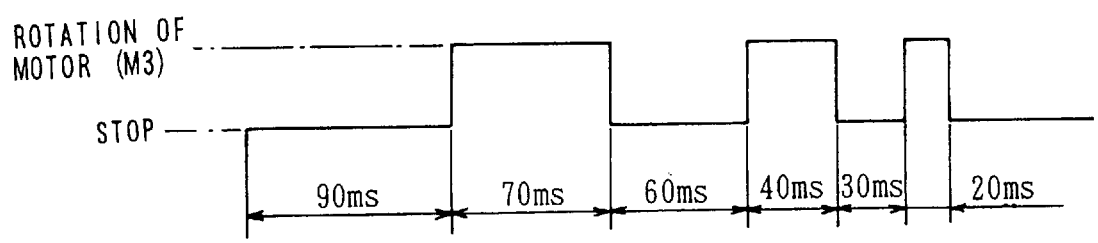
FIG. 39 is a diagram showing the pulse voltage to be supplied to a motor for tray unloading.
Figure 40:
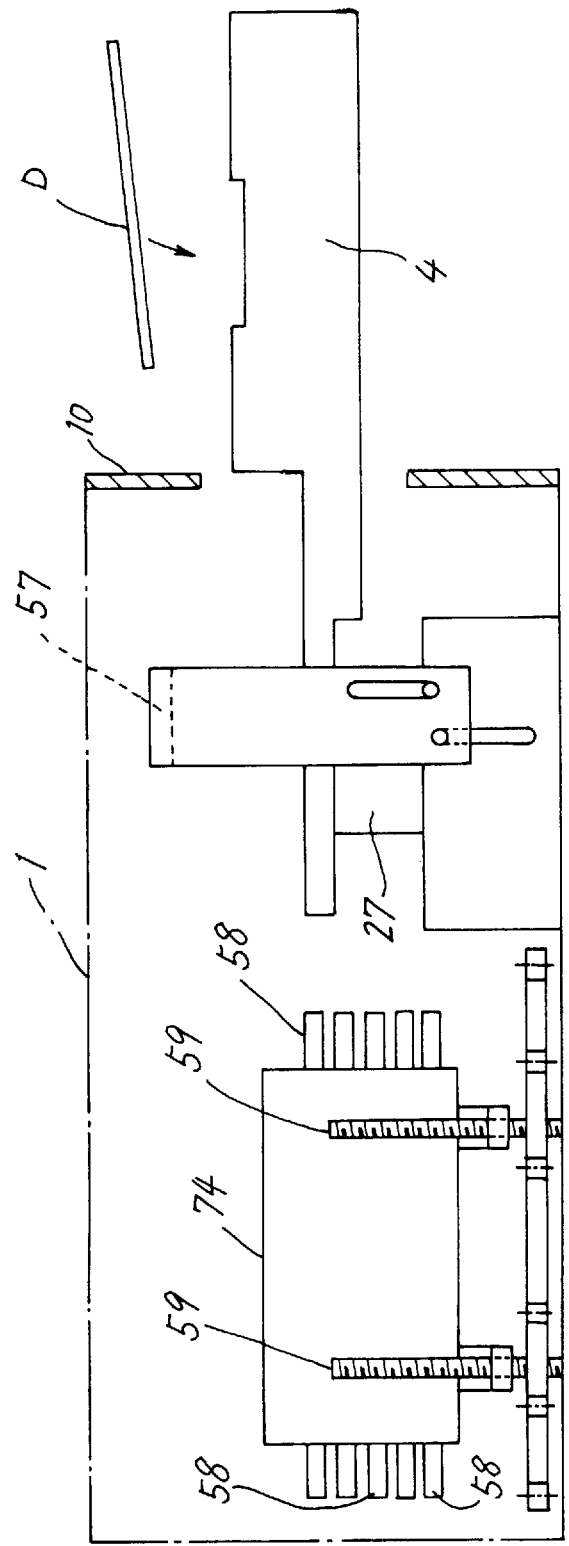
FIG. 40 is a side elevation showing a conventional disk playback device when a disk is to be inserted thereinto.
Figure 41:
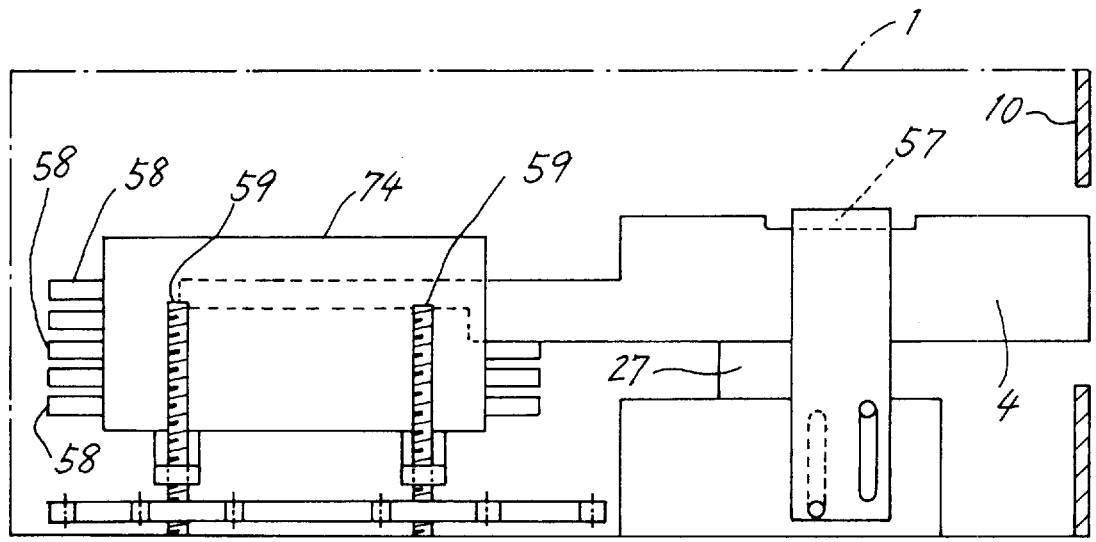
FIG. 41 is a side elevation showing the device in condition for playback with a main tray opposed to an optical head base.
Figure 42:
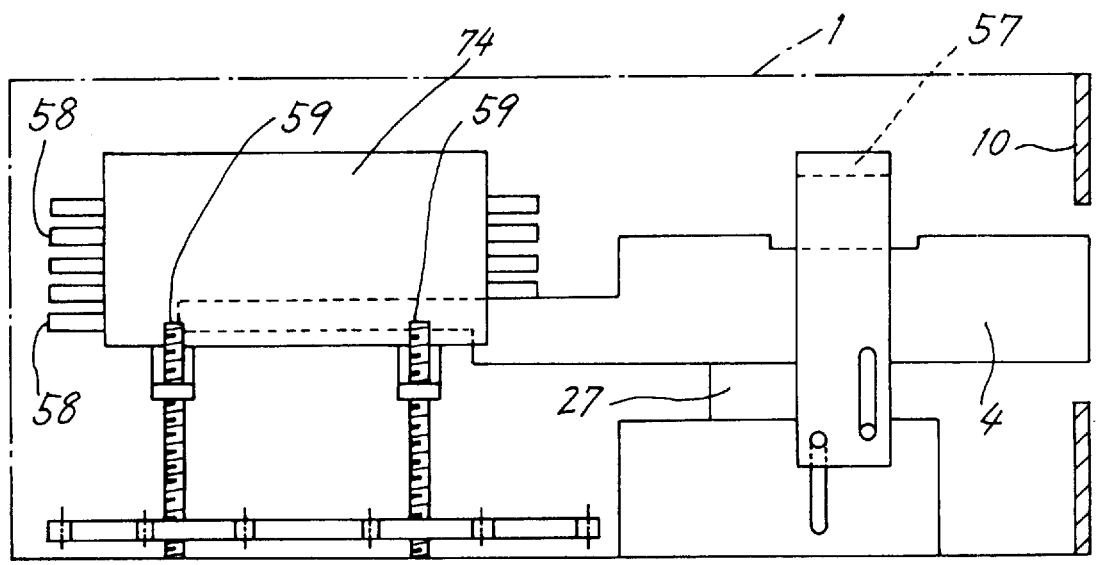
FIG. 42 is a side elevation showing the device with its stacker in a raised position.

The contact wall 63 and the tray holder 5 are made from synthetic resin as previously stated, so that when the wall 63 comes into bearing contact with the edge of the grooved portion 52, the second gear 61 is likely to rotate in the loading direction owing to a resilient repulsive force. To obviate the likelihood, the processor 200 applies a pulse voltage shown in FIG. 39 to the motor M3 to effect the following control.

After the deenergization, the motor M3 is allowed to wait for 90 msec (S7) and then rotated again in the unloading direction for 70 msec (S8, S9). Upon lapse of 70 msec, the motor M3 is stopped (S10), followed by waiting for 60 msec and then again by the rotation of the motor M3 in the unloading direction (S11, S12). Upon lapse of 40 msec, the motor M3 is halted (S13, S14), followed by waiting for 30 msec and then again by the rotation of the motor M3 in the unloading direction (S15, S16). The control operation is completed upon lapse of 20 msec (S17, S18). Thus, a pulse voltage gradually decreasing in duty ratio is given by the processor 200 to the motor M3 for controlling the gear train 6.

In this way, the motor M3 is intermittently driven to gradually decrease the amount of rotation in completing unloading. This reduces the displacement of the second gear 61 due to the resilient repulsive force to be produced when the contact wall 63 comes into contact with the edge of the grooved portion 52. Consequently, the tray 4 can be loaded again smoothly.

When the tray 4 is unloaded thereafter, the operation of steps S1 through S19 are invariably executed.

Loading Control for Ascent and Descent of Tray Holder

Figure 35:
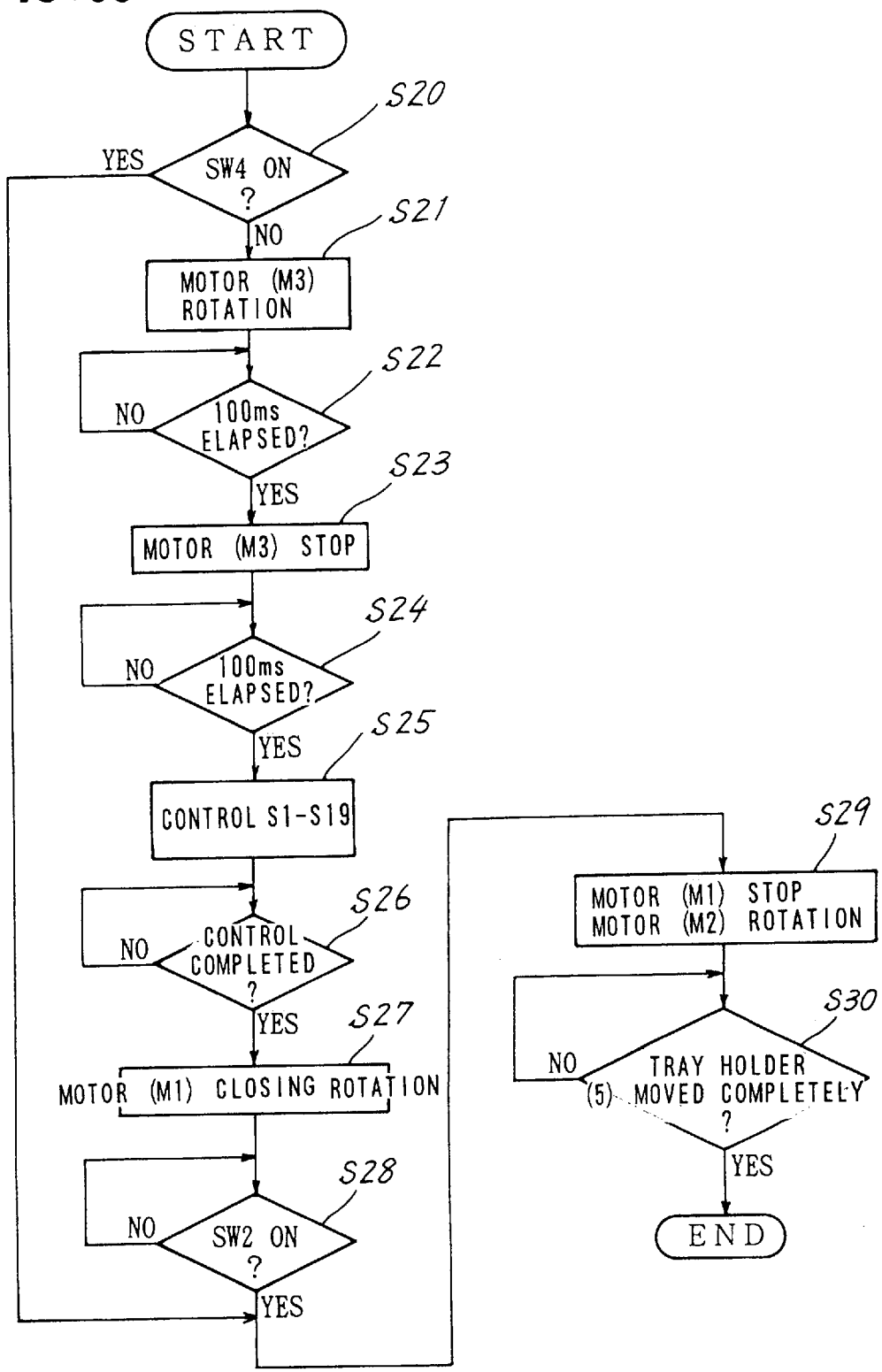
FIG. 35 is a flow chart showing a tray holder raising-lowering procedure.

The control procedure shown in FIG. 35 is carried out when the tray holder 5 is raised or lowered from the current position to a level position corresponding to the position of accommodation of the tray 4 in the stacker 74.

The processor 200 first checks whether the playback position sensor switch SW4 is off (S20). This enables the processor 200 to recognize the level position of the holder 5 when the data in the memory of the processor is lost, for example, owing to a power failure.

If the switch SW4 is initially on, the tray holder 5 is at the position of the head base 27, this indicating that the holder 5 is movable only upward, so that the processor 200 is unlikely to make an error in specifying the direction in which the motor M2 is to be rotated.

When the switch SW4 is found to be off, the motor M3 is rotated in the loading direction once (S21). The motor M3 is halted upon lapse of 100 msec (S 22, S23). Upon lapse of 100 msec after the deenergization of the motor M3 (S24), the motor M3 is reversely rotated to execute the foregoing unloading control procedure of steps Sl through S19 (S25, S26).

This is intended to set the first gear 60 in the proper position of rotation when the tray holder 5 is to be moved upward or downward. If the device main body 1 is subjected to external vibration or impact, the first gear 60 of the gear train 60 is likely to slightly shift in the direction of rotation, displacing the first gear 60 and the rack 42 of the tray 4 relative to each other from the proper position shown in FIG. 10.

In this case, the holder 5 will not smoothly move upward or downward, so that the first gear 60 is set in position by the above procedure to ensure smooth movement of the holder 5. Although the motor M3 is driven for 100 msec in step S21, this period is not limited to 100 msec but is suitably variable.

Next, the motor M1 is rotated to urge the opening-closing slide 80 toward the closing direction (S27). When the closed position sensor switch SW2 shown in FIG. 6 is turned on, the motor M1 is halted (S28). The reason is as follows. When the holder 5 rises or lowers, the support bracket 8 also rises or or lowers, so that if the projection 41 coupled to the tray 4 comes into contact with the engaging claw 82 of the slide 80, the bracket 8 is not movable smoothly. Accordingly, the slide is urged in the closing direction to locate the projection 41 in position and thereby render the bracket 8 smoothly movable.

The motor M2 is thereafter rotated to raise or lower the holder 5 (S29). The control gear 33 rotates, and the sensor SE1 detects the level position where the holder is to be halted, whereupon the motor M2 is halted.

Initial Control with Power on

When the device body 1 is to be transported with the power source off, the trays 4 are stowed in the stacker 74, and the tray holder 5 is caused to reach the head base 27. This state will be referred to as the "initial state."

The reason is as follows. When the holder 5 is brought to the position of the head base 27 as stated above, the shutter plate 700 is lowered, closing the front opening of the stacker plate 75 (see FIG. 29). The shutter plate therefore prevents the tray 4 from shifting forward as released from the guide bar 40 when subjected to impact from outside. With the door 16 closed, the tray 4 is also unlikely to slip out.

Figure 36:
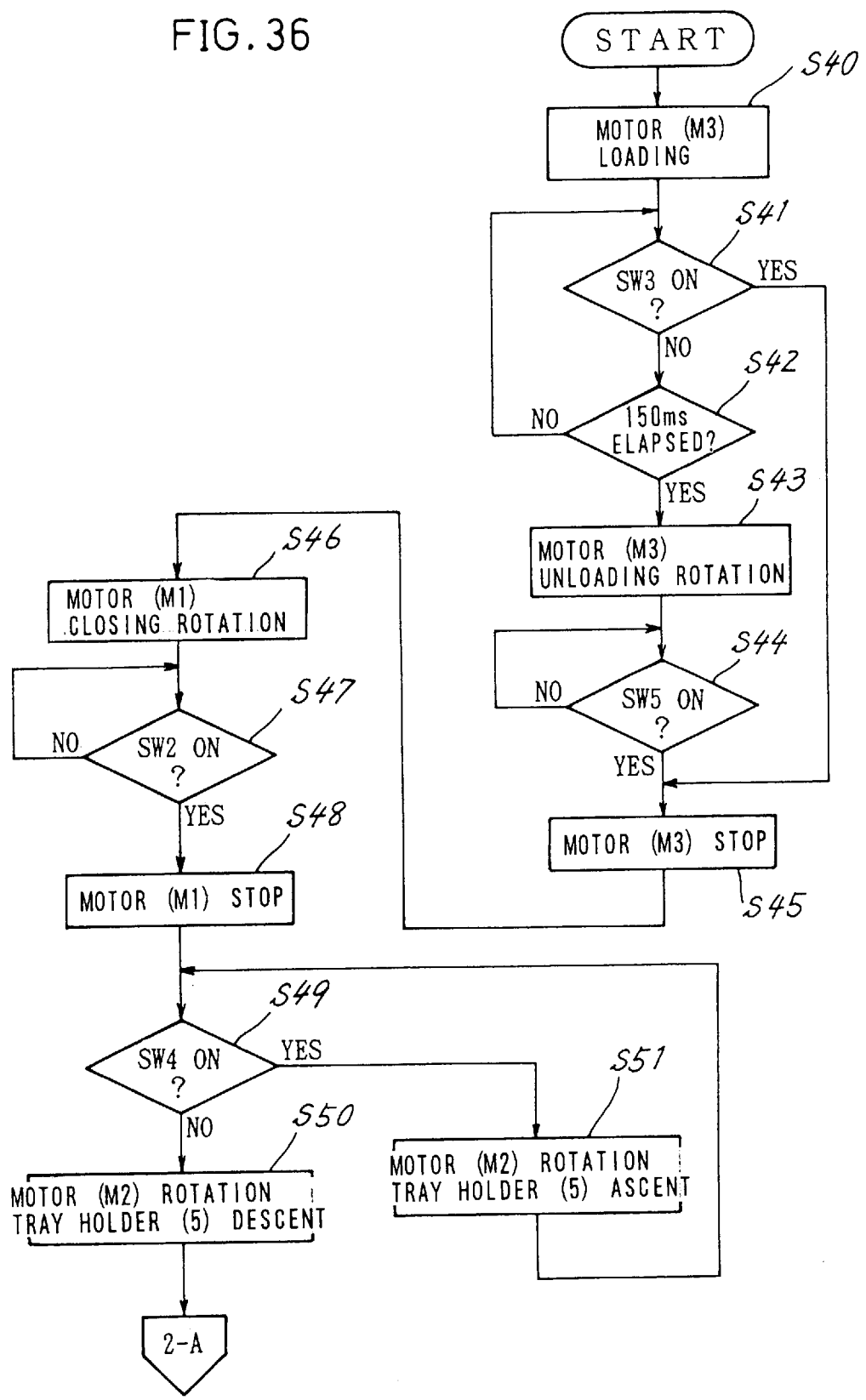
FIG. 36 is a flow chart showing a procedure to be executed when a power source is turned on initially.
Figure 37:
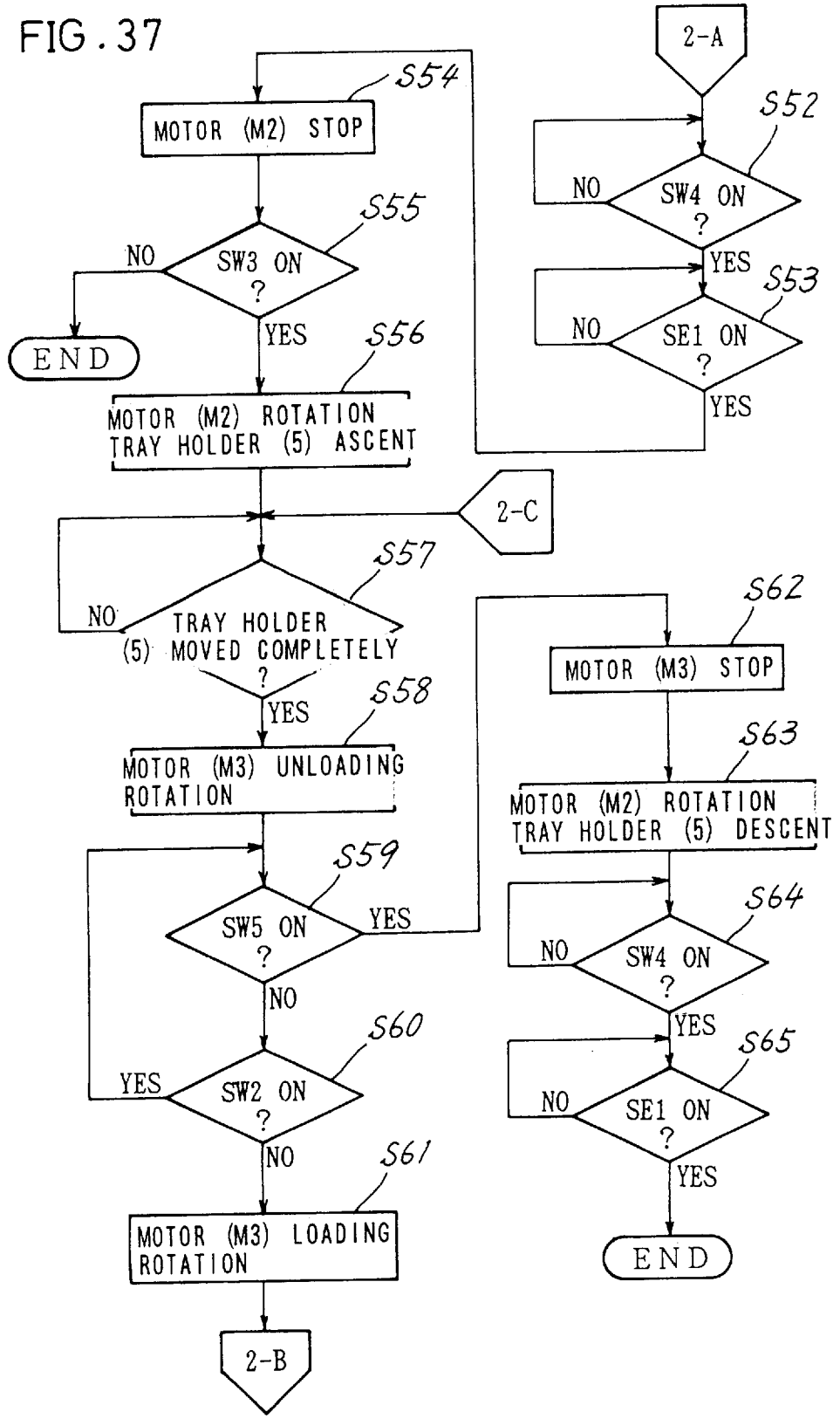
FIG. 37 is a flow chart showing the procedure to be executed when the power source is turned on initially.
Figure 38:
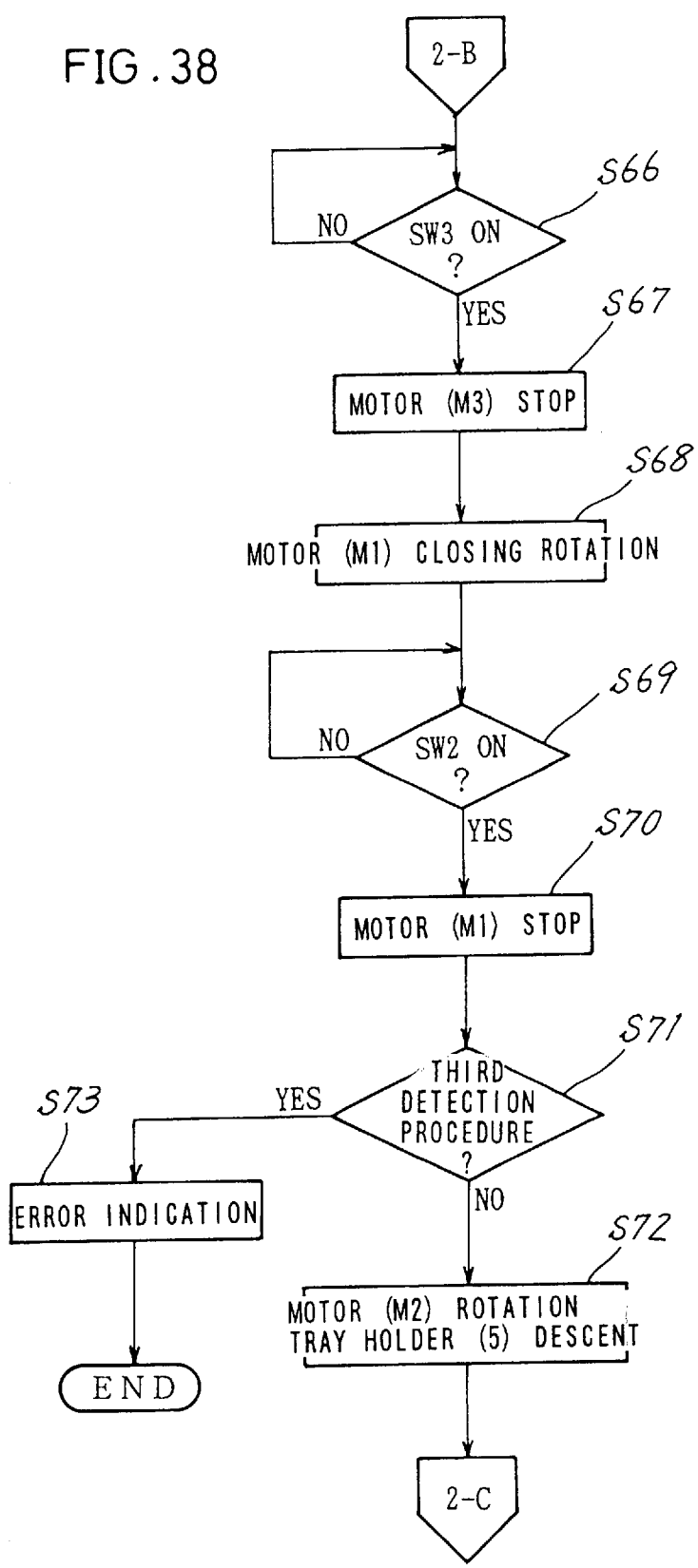
FIG. 38 is a flow chart showing the procedure to be executed when the power source is turned on initially.

In the state wherein the power source is turned on after transport or in the state wherein the power source is turned on again after a power failure, no data is stored in the memory of the processor 200. In this case, the processor 200 executes the initial checking procedure shown in FIGS. 36 to 38.

In order to check whether the tray 4 is placed on the tray holder 5, the mtor M3 is first driven in the loading direction (S40). An inquiry is made as to whether the loading sensor switch SW3 is turned on within 150 msec after the start of rotation of the motor M3 (S41, S42). The motor M3 is rotated for 150 msec because the rotation of the motor M3 for 150 msec is sufficient for detecting the on or off state of the switch SW3.

If the switch SW3 is not turned on, this is interpreted as indicating that no tray 4 is on the holder 5 or that the tray 4 is not fully loaded onto the holder 5, and the motor M3 is driven in the unloading direction (S43). When the unloading sensor switch SW5 is turned on, the motor M3 is halted (S45). The foregoing control procedure of steps S1 through S19 is performed in this unloading process.

When the switch SW3 is turned on within 150 msec, this indicates that the tray 4 has been completely loaded onto the holder 5, so that the motor M3 is halted (S41, S45). The above procedure indicates whether the tray 4 is on the holder 5.

The motor M1 is then driven to bias the slide 80 toward the closing direction (S46). The lock lever 83 engages with the slide 80, and the slide 80 pushes in the closed position sensor switch SW2, whereupon the motor M1 stops (S47, S48). This operation is effected in order to prevent the engaging claw 82 of the slide 80 from coming into contact with the projection 41 of the guide bar 40 as previously described and to thereby smoothly move the bracket 8 and the holder 5 upward or downward.

Subsequently, the holder 5 is moved down into contact with the head base 27, and the tray 4 is stowed in the stacker 74 to resume the initial state. The operation will be described below in detail.

First, the playback position sensor switch SW4 is checked as to whether it is on (S49). If the switch is off, this indicates that the holder 5 has not reached the head base 27. Accordingly, the motor M2 is rotated to advance the second slide member 90 and lower the holder 5 (S50). In moving the holder 5 upward or downward, the control procesure of steps S20 through 30 is of course practiced.

The playback position sensor switch SW4 is turned on, and the sensor SE1 detects complete descent of the tray holder 5, whereupon the motor M2 stops rotating (S52, S53, S54).

If the switch SW4 is found to be on in step S49, the motor M2 is temporarily rotated to raise the holder 5 (S51). When the switch SW4 is turned off, the holder 5 is lowered again to perform the operation of steps S50 through S54.

The reason for performing this operation is as follows. Generally on-off change-over switches have an operation stroke. Accordingly, even if the switch SW4 is initially on, it is likely that the second slide member 90 is slightly displaced from the proper position by vibration from outside. Therefore the second slide member 90 as positioned properly is detected by the sensor SE1 before the subsequent operation is conducted.

If the loading sensor switch SW3 is off after the deenergization of the motor M2 (S55), no tray 4 remains on the holder 5 since unloading is effected by the foregoing steps S43 to S45. This indicates that all the trays 4, 4, 4 are stowed in the stacker 74. Thus, the initial state is resumed wherein the holder 5 is at the position of the optical head base 27, and the initial checking operation is completed.

When the switch SW3 is found to be on in step S55, this indicates that one of the trays 4 is on the tray holder 5. If the device is in the state of re-energization in this case, the processor 200 has stored therein no data as to the level position to which the tray 4 on the holder 5 corresponds, failing to recognize to which position the tray 4 is to be returned.

In this case, the tray 4 is first raised to the position corresponding to the tray No. 1 and unloaded. If the tray 4 is stowed in the stacker 74, a sequence of operations is completed. If otherwise, the tray 4 is returned to the loading completed position again, and the tray 4 and the holder 5 are lowered to the position corresponding to the tray No. 2, followed by the same procedure as above to detect the position within the stacker 74 where the tray is to be stowed. This operation will be described below in detail.

First, the motor M2 is rotated to temporarily raise the holder 5 and the support bracket 8 to the position corresponding to the tray No. 1. The sensor SE1 shown in FIG. 12A counts up the passing detection holes 38 to detect the arrival of the holder 5 and the bracket 8 at the position corresponding to the highest tray 4, whereupon the motor M2 is deenergized (S57).

Next, the motor M3 is rotated to unload the tray 4 (S58). If the tray 4 being unloaded is the tray 4a to be located at the position of No. 1, the tray 4 is stowed as it is in the stacker 74. The gear train 6 rotates, and the unloading sensor switch SW5 is turned on, whereupon the motor M3 is halted (S59, S62). The motor M2 is thereafter driven to lower the holder 5 (S63). The playback position sensor switch SW4 and the sensor SE1 detect the arrival of the holder 5 at the head base 27 (S64, S65), whereupon the motor M2 is stopped. Thus, the initial state is resumed.

It is now assumed that the tray 4 to be unloaded is not the tray 4a, No. 1 as shown in FIG. 31. In this case, the tray 4a is already located at the position of No. 1, with the result that the tray 4 being unloaded pushes the tray 4a rearward.

The support bracket 8 has already been moved to the highest level with the projection 41 of the tray 4a in engagement with the claw 82 on the opening-closing slide 80, so that the slide 80 is pushed rearward to turn on the closed position sensor switch SW2 (S60). Accordingly, the tray 4 as located at a wrong level position is detected. This operation is the same as that described for unloading of the tray 4.

The processor 200 reversely rotates the motor M3 in the loading direction (S61) to load the tray 4. The loading sensor switch SW3 is turned on with the loading of the tray 4 on the holder 5, whereupon the motor M3 stops (S66, S67).

Since the slide 80 is pushed rearward by the tray 4 colliding with the tray 4a, No. 1, holding the closed position sensor switch SW2 off, the motor M1 is subsequently driven to slidingly move the slide 80 forward (S68). The motor M1 is halted when the switch SW2 is turned on (S69, S70). An inquiry is made in step S71 as to whether the above operation has been performed three times. If the answer is in the negative, step S72 follows.

The motor M2 is rotated in step S72 to lower the tray holder 5 by one stage, i.e., to the level position corresponding to the intermediate position. Steps S57 through S70 are thereafter repeated.

When the foregoing operation is performed for three level positions, the tray 4 is invariably stowed in one of the level positions. If the tray 4 can not be stowed at any level position within the stacker 74, the processor 200 indicates a mechanical error on the front panel 10, notifying the user of a fault occurring in the mechanical deck 100 (S73). The mechanical error is indicated, for example, by turning on an error indicator lamp provided on the front panel 10.

Such a mechanical error appears attributable to a malfunction of the sensor SE1 or presence of extraneous matter or article within the stacker 74 for the tray 4 to be placed in. The error indication notifies the user of a need for remedy.

Since the checking operation is performed when the power source is initially turned on, there is no need to additionally provide sensor means for checking whether the tray 4 is located in the proper level position. The level position where the tray 4 is to be stowed can therefore be detected easily and reliably.

The present invention is not limited to the foregoing embodiment in construction but can be modified variously within the scope set forth in the appended claims.

What is claimed is:

1. A disk playback device comprising:

a stacker provided within a main body of the device;

a plurality of trays horizontally disposed one above another within the stacker and each of the plurality of trays adapted to carry a disk thereon;

an optical head base provided in a bottom portion of the main body of the device for playing back the disk;

a tray opening-closing mechanism engageable with a desired tray of the plurality of trays for moving the desired tray between the stacker and a disk discharge position for opening or closing;

a transport mechanism for approximately horizontally moving the tray between the stacker and a loading completed position above the head base;

first and second slide members for raising or lowering the tray, relative to the head base, after the tray is brought to the loading completed position by the transport mechanism; and a third slide member for raising or lowering the tray opening-closing mechanism as timed with the raising or lowering of the tray, the third slide member being formed with a cam groove for raising or lowering the tray opening-closing mechanism with the tray held at the position of the head base by the completion of sliding movement of the first and second slide members, the tray opening-closing mechanism being coupled with another tray within the stacker when brought to a raised position.

2. A disk playback device as defined in claim 1 wherein the second and third slide members are coupled with a gear mechanism drivable by a single motor, and the gear mechanism has a gear and drive gear for temporarily interrupting a sliding movement of the third slide member between a state wherein the tray and the tray opening-closing mechanism are lowered from the loading completed position to a position opposed to the lowermost tray and a state wherein the third slide member starts to raise the tray opening-closing mechanism with the tray held at the position of the head base.

* * * * *